US011200750B2

(12) United States Patent
Auvray et al.

(10) Patent No.: US 11,200,750 B2
(45) Date of Patent: *Dec. 14, 2021

(54) THREE DIMENSIONAL MODEL OF A BODY PART

(71) Applicant: KONINKLIJKE PHILIPS N.V., Eindhoven (NL)

(72) Inventors: Vincent Maurice André Auvray, Meudon (FR); Raoul Florent, Ville D'Avray (FR); Romane Isabelle Marie-Bernard Gauriau, Paris (FR); Alexandra Groth, Hamburg (DE); Juergen Weese, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 24 days.

This patent is subject to a terminal disclaimer.

(21) Appl. No.: 16/066,424

(22) PCT Filed: Dec. 21, 2016

(86) PCT No.: PCT/EP2016/082044
§ 371 (c)(1),
(2) Date: Jun. 27, 2018

(87) PCT Pub. No.: WO2017/114700
PCT Pub. Date: Jul. 6, 2017

(65) Prior Publication Data
US 2019/0019347 A1    Jan. 17, 2019

(30) Foreign Application Priority Data
Dec. 30, 2015  (EP) .................................... 15307184

(51) Int. Cl.
*G06T 19/20* (2011.01)
*G06T 7/33* (2017.01)
(Continued)

(52) U.S. Cl.
CPC ............ *G06T 19/20* (2013.01); *G06T 7/0012* (2013.01); *G06T 7/30* (2017.01); *G06T 7/344* (2017.01);
(Continued)

(58) Field of Classification Search
CPC ................................ G06T 19/20; G06T 7/344
See application file for complete search history.

(56) References Cited

U.S. PATENT DOCUMENTS

| 2003/0031351 A1 | 2/2003 | Yim |
| 2005/0147283 A1 | 7/2005 | Dwyer |

(Continued)

FOREIGN PATENT DOCUMENTS

WO    2007026598 A1    3/2007

OTHER PUBLICATIONS

Schoonenberg, Gert et al, "Projection based motion compensation and reconstruction of coronary segments and cardiac implantable devices using rotational X-ray angiography", Medical Image Analysis, vol. 13, Issue 5, Oct. 2009, pp. 785-792.

(Continued)

*Primary Examiner* — Yi Yang

(57) ABSTRACT

An apparatus provides a patient specific 3D model of a body part. At least one 2D X-ray image including 2D X-ray image data of a vascular structure of a patient's body part is provided. A 3D model of the body part is provided, the 3D model including a 3D modelled vascular structure. At least one parameter commands an appearance of the 3D modelled vascular structure. The 3D modelled vascular structure is compared with the 2D X-ray image data of the vascular structure to determine the at least one parameter. The 3D model is updated as a function of the determined at least one parameter. A medical report is generated based on information determined from the 3D model.

18 Claims, 8 Drawing Sheets

(51) Int. Cl.
*G06T 7/30* (2017.01)
*G06T 7/73* (2017.01)
*G06T 7/00* (2017.01)

(52) U.S. Cl.
CPC ...... *G06T 7/75* (2017.01); *G06T 2207/10116* (2013.01); *G06T 2207/10124* (2013.01); *G06T 2207/30048* (2013.01); *G06T 2207/30101* (2013.01); *G06T 2219/2016* (2013.01)

(56) References Cited

U.S. PATENT DOCUMENTS

| | | | |
|---|---|---|---|
| 2006/0050941 A1 | 3/2006 | Middleton | |
| 2006/0098010 A1 | 5/2006 | Dwyer | |
| 2006/0188139 A1 | 8/2006 | Khamene | |
| 2006/0235287 A1* | 10/2006 | Desmedt | A61B 6/12 600/407 |
| 2007/0014451 A1 | 1/2007 | Dwyer | |
| 2007/0031018 A1 | 2/2007 | Camus | |
| 2010/0098309 A1 | 4/2010 | Graessner | |
| 2010/0172567 A1* | 7/2010 | Prokoski | A61B 5/0064 382/132 |
| 2012/0148135 A1* | 6/2012 | Van Rens | G06T 7/143 382/131 |
| 2013/0070907 A1* | 3/2013 | Hornung | A61B 6/035 378/197 |
| 2013/0094749 A1 | 4/2013 | Oh | |
| 2013/0172906 A1* | 7/2013 | Olson | A61B 34/71 606/130 |
| 2013/0230225 A1* | 9/2013 | Waechter-Stehle | G06T 7/11 382/131 |
| 2013/0266123 A1* | 10/2013 | Yoshida | A61B 6/12 378/98.5 |
| 2014/0254910 A1* | 9/2014 | Jerebko | A61B 6/5211 382/132 |
| 2014/0257094 A1* | 9/2014 | Meetz | A61B 6/5217 600/425 |
| 2014/0316758 A1* | 10/2014 | Yagi | A61B 5/026 703/9 |
| 2014/0371896 A1 | 12/2014 | Landon | |
| 2015/0254043 A1 | 9/2015 | Boxkaya | |
| 2016/0089095 A1* | 3/2016 | Baumgart | A61B 6/4441 382/130 |

OTHER PUBLICATIONS

Lacroix, Romain et al, "Model-based segmentation of the left main coronary bifurcation from 2D angiograms", ISBI 2012.

Auvray, V. et al "Improved vessel enhancement for fully automatic coronary modelling". SPIE Medical imaging 2009.

Kirbas, Cemil et al, "A review of vessel extraction techniques and algorithms", vol. 36, No. 2, 2003.

Dodge, J. Theodore et al "Intrathoracic spatial location of specified coronary segments on the normal human heart. Applications in quantitative arteriography, assessment of regional risk and contraction, and anatomic display," Circulation, vol. 78, No. 5, 1988.

Weese, Juergen et al "The Generation of Patient-Specific Heart Models for Diagnosis and Interventions", Statistical Atlases and Computational Models of the Heart, Sep. 2010.

Mollus, Sabine et al "Model-to-Image Based 2D-3D-Registration of Angiographic Data", Medical Imaging 2008, Prov. of SPIE, vol. 6914.

Jomier, Julien et al "3D/2D Model-to-Image Registration Applied to TIPS Surgery", MICCAI, 2006, pp. 662-669.

Groher, Martin et al "Deformable 2D-3D Registration of Vascular Structures in a One View Scenario", IEEE Transactions on Medical Imaging, vol. 28, No. 6, 2009.

Bredno, Jorg et al "Algorithmic Solutions for Live Device-to-Vessel Match". Proceedings of SPIE—vol. 5370, Medical Imaging 2004: Image Processing, pp. 1486-1497.

Sanborn, Timoth A. et al,"ACC/AHA/SCAI 2014 Health Policy Statement on Structured Reporting for the Cardiac Catheterization Laboratory", Journal of the American College of Cardiology, vol. 63, Issue 23, Jun. 2014.

Kita, Yasuyo et al "Real-Time Registration of 3D Cerebral Vessels to X-Ray Angiograms", ISSN 0919-6072, vol. 98, No. 103, 1998.

Mori et al: "Efficetive Doses in Subjects Undergoing Computed Tomography Cardiac Maging With the 256-Multislice CT Scanner"; European Journal of Radiology 65 (2008), pp. 442-448.

* cited by examiner

THREE DIMENSIONAL MODEL OF A BODY PART

CROSS-REFERENCE TO PRIOR APPLICATIONS

This application is the U.S. National Phase application under 35 U.S.C. § 371 of International Application No. PCT/EP2016/082044, filed on Dec. 21, 2016, which claims the benefit of European Patent Application No. 15307184.0, filed on Dec. 30, 2015. These applications are hereby incorporated by reference herein.

FIELD OF THE INVENTION

The present invention relates to an apparatus for providing a patient specific 3D model of a body part to be used typically for a clinical interventional report, to a medical system for providing a patient specific 3D model of a body part to be used typically for a clinical interventional report, and to a method for providing a patient specific 3D model of a body part to be used typically for a clinical interventional report, as well as to a computer program element and a computer readable medium.

BACKGROUND OF THE INVENTION

In vascular treatments, for example in Percutaneous Transluminal Coronary Angioplasty (PTCA) to treat cardiac stenosis, information relating to the vascular treatments is required to be provided. Important findings of the vascular treatment are documented by annotating the flattened diagram of the coronary arteries. In particular, the clinician has to describe which stenosis was treated, for instance by localizing them onto a flattened schematic graph of the coronary arteries and their severity.

US 2010/0098309A1 describes a system and method of analyzing and using volumetric data of a patient is disclosed. Volumetric data characterizing a patient is obtained using an imaging modality such as a computerized tomographic device (CT), magnetic resonance imager (MR), or other tomographic modality. The volumetric data or image slices derived from the data is compared with anatomical image or model data from an anatomical atlas so as to associate the patient data with a body structure. The anatomical association is used as a search term in a data base to retrieve information which may be useful in diagnosis or treatment of the patient.

However, the flattened schematic graph of the coronary arteries is far from the actual vascular structure as observed in an angiographic image, and as a result it is not straightforward for the clinician to match features within the angiographic image with those on the schematic graph of the coronary arteries. This is especially the case when the variability in the coronary trees across the population is also taken into account.

SUMMARY OF THE INVENTION

It would be advantageous to have an improved technique for interpreting angiograms.

The object of the present invention is solved with the subject matter of the independent claims, wherein further embodiments are incorporated in the dependent claims. It should be noted that the following described aspects of the invention apply also for the apparatus for providing a patient specific 3D model of a body part, the medical system for providing a patient specific 3D model of a body part, the method for providing a patient specific 3D model of a body part, and for the computer program element and the computer readable medium.

According to a first aspect, there is provided an apparatus for providing a patient specific 3D model of a body part, the apparatus comprising:

an input unit; and
a processing unit.

The input unit is configured to provide at least one 2D X-ray image comprising 2D X-ray image data of a vascular structure of a patient's body part. The input unit is also configured to provide a 3D model of the body part, the 3D model comprising a 3D modelled vascular structure, wherein at least one parameter commands an appearance of the 3D modelled vascular structure. The 3D model is a generic model of the body part. The processing unit is configured to confront the 3D modelled vascular structure with the 2D X-ray image data of the vascular structure to determine the at least one parameter. The processing unit is also configured to update the 3D model as a function of the determined at least one parameter. The processing unit is configured to generate a medical report based on information determined from the 3D model.

In other words, in the example of the body part being a heart an underlying 3D model of the coronary arteries is relied on, and is progressively adapted based on the observed angiographic sequences. To put this another way, the appearance of the 3D modelled vascular structure (e.g. branching structure), such as the length of segments, which branches are present, which branches branch from which and where (position of the branch), the orientation and curvature of branches (in other words, for the example of a heart, the coronary structure) can be modified by adapting the at least one parameter until the appearance of the 3D modelled vascular structure is representative of the patient's heart. Therefore, adapting the at least one parameter can relate to changing the position, length, orientation and curvature of branches and as such the adaptation can be considered to comprise the application of a scaling factor. The scaling factor, which relates to such "internal" model parameters, can comprise an affine transformation. In other words, not only can the model of the body part be changed in size uniformly but it can be scaled differently across the model of the body part; a scaling factor could linearly increase across the model of the body part such that at one extreme of the model of the body part the body part is not changed in size, but at the other extreme of the model of the body part the body part has been changed in size. The intermediate parts of the model of the body part can then be linearly or non-linearly scaled between the two extremes. Therefore, not only can the structure of the coronary tree be adapted to match that of a patient, but the model size can vary to account for varying sizes of body parts between patients. In this manner, 2D X-ray image data of the vascular structure (the angiogram) is used along with a generic 3D model of a body part to generate a patient specific 3D model of the body part. The term "angiogram" relates to a visualization of the blood vessels of the heart region, and/or vascular structure outside of the heart, of the patient.

In other words, by confronting the 3D modelled vascular structure with the 2D X-ray image data (e.g. angiogram) the parameter or parameters that command, or define, the appearance of the 3D modelled vascular structure can be determined. The determined parameter(s) can then be used to provide an improved 3D model of the body part. By confronting the 3D modelled vascular structure to a number of different 2D X-ray images acquired at different angulations through the body part, the 3D model of the body part can be progressively improved until a patient specific 3D model of the body part has been provided, or can be improved on the basis of a single computation when a number of images are confronted to the 3D model at the same time.

In this manner, a generic 3D model of the body part can be used to create a patient specific 3D model of the body part by determining at least one parameter governing the appearance of the 3D model on the basis of an angiogram or angiograms of the body part. In this way, 2D X-ray images of a body part, such as angiograms of a patient's heart, can be acquired at different times during a medical procedure and be separated by seconds or minutes, and be used to generate the patient specific 3D model of the body part. 2D X-ray images, acquired on different days, or over the course of a patient's treatment at a hospital or at different hospitals, can be used to generate the 3D model of the body part that represents the current status of the patient, being refined on the basis of one or more new angiograms (for the example of a heart) when they become available.

In this manner, the patient specific 3D model of the body part has been determined without a volumetric image acquisition, such as a CT scan, needing to be performed, with the 3D model been determined solely from 2D imagery. To explain this further, a CT, or C-arm CT, acquires a series of 2D images as the scanner rotates about the patient, and a 3D volume is computed from this series; in other words, the CT derived volume is derived solely from 2D images. In the present situation, a 3D model of the body part is provided, which could be a generic patient non-specific 3D model or an old 3D model for the patient, and the 3D model is updated on the basis of 2D X-ray images, that could be acquired on different days or be separated by seconds or minutes, and the 3D model is updated by confronting the 2D images with the 3D vascular structure of the model.

The patient specific 3D model of the body part can then be used within a number of clinical procedures, for example to aid or augment reporting of the 2D X-ray image data that was used in generation of the patient specific 3D model. In some examples, the patient specific model need only be an approximate model to provide such functionality.

In other words, X-ray images (such as an angiogram from an angiogram sequence) can be associated with a 2D projection of a modelled vascular tree (for example the coronary tree) derived from a patient specific 3D model, where the 2D projection of the modelled vascular tree is presented from a similar perspective to that applied during acquisition of the angiogram.

To put this another way, a patient specific 3D model of the body part can be generated, for which all the branch structure of the vascular structure is known. The 3D model can then be appropriately manipulated such that a 2D projection of the 3D modelled vascular structure is presented at the same angulation as that used during acquisition of an angiogram. Then, because the 3D vascular structure in the 3D model is known, i.e., all the component parts of the vascular tree are known and can be named, the 2D projection of the 3D model vascular structure can enable the structure within the 2D angiogram to be more easily interpreted. Furthermore, because the 2D projection of the 3D modelled vascular structure is of a known structure, the clinician can easily determine the identity of parts of the vascular structure in the angiogram through reference to the 2D projection of the 3D modelled vascular structure. The clinician is able to easily identify the arteries in the angiogram by their anatomical names, through reference to the matching 2D projection of the 3D model that shows the 2D projection of the modelled vascular structure as if the 3D model of the heart had itself been subjected to X-ray analysis from the same direction as that used to acquire the angiogram.

In other words by automatically exploiting the angiographies acquired during the exam a patient specific 3D model of the heart can be generated which can be used in order to adapt the coronary diagram, making it also patient specific. This would reduce the gap that exists between the observed angiographies and the coronary diagram, allowing a more intuitive and more accurate annotation, and avoiding the manual selection of specific anatomies. Moreover, the interpretation of such a report would be easier and lead to less misunderstandings. This is done by relying on a 3D geometrical model of the coronary arteries, that is successfully or simultaneously confronted with the observed angiographic sequences. To put this another way, a resulting patient-specific coronary model can be transformed into a form suitable for reporting. It can be a flattened 2D model with correct anatomy, branching and segment significance. Or it could be the adapted 3D model directly, in the case of a digital report where the user could rotate the model.

In an example, the processing unit is configured to confront the 3D modelled vascular structure with the 2D X-ray image data of the vascular structure. The processing unit is configured to determine a 2D projection of the 3D model of the body part, the 2D projection of the 3D model of the body part comprising a 2D projection of the 3D modelled vascular structure. The processing unit is configured to adapt the at least one parameter such that a 2D projection of the adapted 3D modelled vascular structure is representative of the 2D X-ray image data of the vascular structure of the patient's body part. The adapted at least one parameter forms the determined at least one parameter.

To put this another way, angiograms of the acquired angiographic sequence will be confronted to the re-projected 3D model (from the same perspective). The parameters commanding the appearance of the 3D model (and thus of its 2D projection) are adapted in order to reduce the difference observed between the angiographic image and the projected model. This can involve pose estimation, i.e., estimation of the orientation of the 3D model that suitably matches the orientation of the body part (e.g. heart) when an angiogram was taken. The pose can be estimated before, or together with, the model internal parameters (the pose parameters which result in large difference in the 2D reprojection can be set before, or together with, those that result in finer discrepancies).

This adaptation is performed successively on each angiographic sequence if required, which could mean that every angiogram is used or only a subset of available angiograms is used.

In other words, an optimisation process is performed on the at least one parameter of the 3D model so that a 2D projection of that model matches the observed angiography.

In an example, the processing unit is configured to modify the at least one parameter until the 2D projection of the modified 3D modelled vascular structure is representative of the at least 2D X-ray image data of the vascular structure. In this way, the at least one parameter is adapted.

In other words, the parameters of the 3D model are varied in order to warp the 3D model and its 2D projection of the 3D vascular structure, until the warped 2D projection of the 3D vascular structure best matches the actual angiogram. The new parameters of the 3D model are now the determined parameters of the improved model. This process can then be performed from an angiogram taken from a different perspective, and where the model is then viewed from that same perspective. It can alternatively be performed on different angiograms simultaneously.

In an example, the processing unit is configured to confront the 3D modelled vascular structure with the 2D X-ray image data of the vascular structure. The processing unit is configured to transform the 3D model of the body part. The transform of the 3D model of the body part comprises a determination of the pose of the 3D model of the body part.

In other words, the processing unit is configured the transform the 3D model, through for example rotation, and/or translation of the 3D model, until the vascular structure in a 2D projection of the model matches, or at least most closely matches, the vascular structure in the actually acquired angiogram. To put this another way, the 3D model is transformed until the vascular structure in a 2D projection of the model most closely correlates with the 2D X-ray image data of the vascular structure in the angiogram. The 3D model is then positioned in the same orientation as the patient's heart when the angiogram was acquired, and the at least one parameter can then be adapted to make the 3D model coherent with the patient's body part (e.g. heart).

In an example, the input unit is configured to provide information relating to a geometrical configuration of an X-ray acquisition unit that was used to acquire the at least one 2D X-ray image, and wherein the transform of the 3D model of the body part comprises utilization of the information relating to the geometrical configuration of the X-ray acquisition unit.

In other words, information relating to the position of the X-ray source and detector in relation to the patient, such that the direction that the X-rays passed through the body part is approximately known, can be used in order to position and orientate the 3D model in a corresponding position to the patient's body part such that the 2D projection of the 3D model will already closely resemble the 2D angiogram.

To put this another way, the 3D coronary model can be projected with the C-arm angulations corresponding to the considered angiography (yielding a 2D diagram corresponding to the view at hand). Then, an optimization process can be performed on the 3D geometric parameters so that the 2D diagram would match the observed angiography.

In an example, the processing unit is configured to enable a user to annotate the at least one 2D projection of the 3D modelled vascular structure associated with the transformed 3D model of the body part, and wherein the processing unit is configured to apply the annotation to the 3D modelled vascular structure of the 3D model of the body part.

In other words, a clinician is enabled to transparently and accurately fill in his findings. The clinician can choose which of the angiographic image (2D X-ray image)/2D diagram (2D projection of the 3D modelled vascular structure) couples he wishes to use to annotate the coronary tree. Editing one of the diagrams (to position a stenosis for instance) will update all of them (since they present all a specific view of the same object—the generic 3D model).

In an example, the processing unit is configured to enable a user to select a reporting format for reporting the at least one 2D projection of the 3D modelled vascular structure associated with the transformed 3D model of the body part, and/or the 3D modelled vascular structure associated with the transformed 3D model of the body part and/or the transformed 3D model of the body part.

In other words, a clinician is enabled to select the format in which he wants to present that information in a report. A straightforward way is to export some of the angiography/ reprojected 2D diagram couples into the report. This will allow a clinician that would read the report to intuitively and accurately understand the nature of the findings of the exam. The user will also be able to generate other graphics summarizing his findings in a more concise yet compact way. He could resort to a flattened schematic 2D diagram (built from the 3D modelled vascular structure), or to a 3D tree (the 3D modelled vascular structure) that he rotate in a digital report. In an example, one or more of the above diagrams can be annotated.

In this manner, a clinician is provided with the ability to fill in his findings (by for example clicking either on the 2D images, reprojected 3D model or 3D model, if necessary by entering them on different 2D images or projections).

To put this another way, the clinician or user can choose in which format he wants his findings to be presented in the report. He could resort to some of the angiography/2D projected model annotated diagram couples, and/or generate compact schematic representations (flattened 2D diagram, editable 3D diagram in a digital report).

In an example, the processing unit is configured to confront the 3D modelled vascular structure with the 2D X-ray image data of the vascular structure. The processing unit is configured to indicate at least one segment of the vascular structure in the at least one 2D X-ray image of the vascular structure. The processing unit is configured to perform at least one measurement on the at least one segment and associate the at least one segment of the vascular structure in the at least one 2D X-ray image of the vascular structure with a corresponding at least one segment of the 3D modelled vascular structure. The processing unit is configured to adapt the at least one parameter as a function of the at least one measurement. The adapted at least one parameter forms the determined at least one parameter.

In an example, the at least one 2D X-ray image comprises a plurality of images; wherein, the processing unit is configured to select a well injected 2D X-ray image from the plurality of images.

In an example, an X-ray acquisition unit that was used to acquire the at least one 2D X-ray image was static at the time the at least one 2D X-ray image was acquired.

In this manner, regular X-ray sequences can be acquired, for example by a static C-arm acquisition unit, during the exam without those images needing to be acquired in a specific protocol, or in a specific sequence. In other words, when the at least one X-ray image comprises a plurality of images those images can be acquired when a clinician has positioned the C-arm system to acquire a specific image, and as such can be separated by seconds or minutes, and could even apply to images acquired during different examinations over different days.

According to a second aspect, there is provided a medical system for providing a patient specific 3D model of a body part, the system comprising:
  an X-ray image acquisition unit;
  an apparatus for providing a patient specific 3D model of a body part according to any of the preceding examples and aspect; and
  an output unit.

The X-ray image acquisition unit is configured to provide the at least one 2D X-ray image. The output unit is configured to output data representative of the patient specific 3D model of the body part.

By providing a medical system for providing a patient specific 3D model of a body part, a clinician is automatically provided with an accurate 3D model of the patient's body part and not of a generic body part and this is useable in preparing for example the required reporting information associated with any intervention of the body part that has occurred. For example, by using a 2D projection of the 3D model where that 2D projection has the same angulation as an angiogram of the heart (example of a body part) the clinician is provided with information regarding the names of the parts of the coronary tree of the patient, enabling full and accurate reporting of both an intervention that is to be conducted and reporting of an intervention that has been conducted. In this manner, the clinician can easily in the future review the angiograms and understand their spatial context, and different clinicians can review the angiograms and be automatically provided with information relating to the vascular structure observed within the angiograms without having to interpret the images. The clinician is also provided with a correspondence between various angiographies.

According to a third aspect, there is provided a method for providing a patient specific 3D model of a body part, the method comprising:
 a) providing at least one 2D X-ray image comprising 2D X-ray image data of a vascular structure of a patient's body part;
 b) providing a 3D model of the body part, the 3D model comprising a 3D modelled vascular structure, wherein at least one parameter commands an appearance of the 3D modelled vascular structure and wherein the 3D model is a generic model of the body part;
 c) confronting the 3D modelled vascular structure with the 2D X-ray image data of the vascular structure to determine the at least one parameter;
 d) updating the 3D model as a function of the determined at least one parameter; and
 e) generating a medical report based on information determined from the 3D model.

According to another aspect, there is provided a computer program element controlling apparatus as previously described which, in the computer program element is executed by processing unit, is adapted to perform the method steps as previously described.

According to another aspect, there is provided a computer readable medium having stored computer element as previously described.

Advantageously, the benefits provided by any of the above aspects equally apply to all of the other aspects and vice versa.

The above aspects and examples will become apparent from and be elucidated with reference to the embodiments described hereinafter.

BRIEF DESCRIPTION OF THE DRAWINGS

Exemplary embodiments will be described in the following with reference to the following drawings.

DETAILED DESCRIPTION OF EMBODIMENTS

Figure 1:
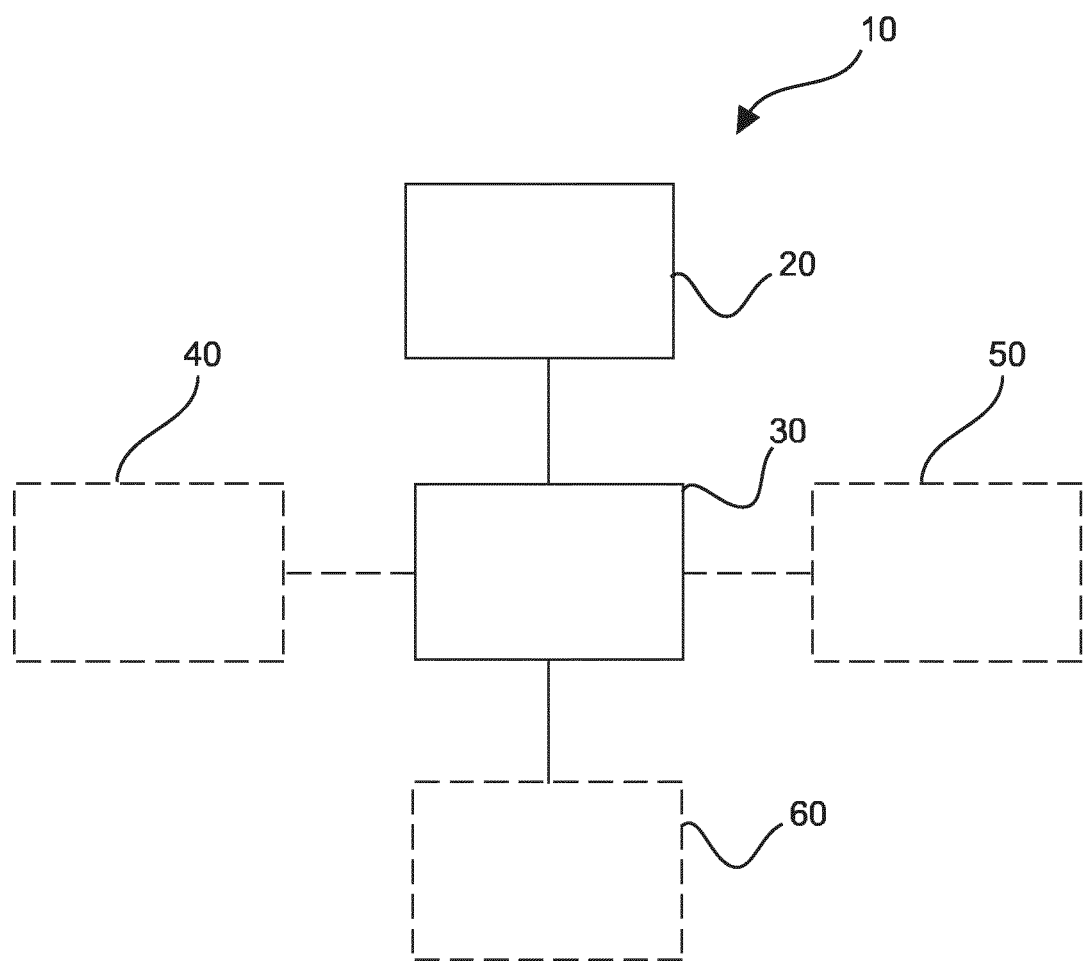
FIG. 1 shows a schematic set up of example of an apparatus for providing a patient specific 3D model of a body part.

FIG. 1 shows an example of an apparatus 10 for providing a patient specific 3D model of a body part. The apparatus comprises an input unit 20 and a processing unit 30. The input unit 20 is configured to provide at least one 2D X-ray image comprising 2D X-ray image data of a vascular structure of a patient's body part to the processing unit 30. The input unit 20 is also configured to provide a 3D model of the body part to the processing unit 30, the 3D model comprising a 3D modelled vascular structure, wherein at least one parameter commands an appearance of the 3D modelled vascular structure. The processing unit 30 is configured to confront the 3D modelled vascular structure with the 2D X-ray image data of the vascular structure to determine the at least one parameter. The processing unit 30 is also configured to update the 3D model as a function of the determined at least one parameter. The processing unit 30 is configured to generate a medical report based on information determined from the 3D model.

In an example, the body part is a heart and the 3D model is a geometrical model of the coronary arteries. In an example, the appearance of the 3D modelled vascular structure can be considered to relate to a branching relationship of the vascular structure of the 3D model. In an example, the appearance of the 3D modelled vascular structure relates to any or all or any combination of the following: the angle of one branch to another; whether a specific branch is present or not; which branch originates from which branch; the branch lengths; the position of the bifurcations (defining different segments of each branch); precisions on the radii of segments; and the precisions on the curvature of the different segments. In other words, the appearance of the 3D modelled vascular structure defines, for the example of a heart, the coronary structure. In an example, by confronting the 3D modelled vascular structure with the 2D X-ray image data of the vascular structure, default value(s) for the at least one parameter can be revised in order to provide a patient specific 3D model of the body part. To put this another way, the at least one parameter commands for example: which segment is linked to which segment; the length of segments (which can be interpreted as the way they are branched); the appearance of each segment: thickness, orientation, tortuosity; and the pose of orientation of the model.

In an example, the at least one parameter is progressively updated with respect to different 2D X-ray image data being confronted, with respect (e.g. for a heart) angiograms at different angles through the heart and/or angiograms at the same angle through the heart but with different parts of the vascular structure having been injected with contrast agent and hence being observed in a visible and distinct manner.

In an example, a number of 2D X-ray images at different orientations through for example the heart are confronted with the 3D modelled vascular structure at the same time, and the at least one parameter is determined. In this manner, a single computation is used to determine the at least one parameter, and the 3D model needs not necessarily be progressively adapted.

In an example, to confront comprises to examine and/or compare.

In an example, the 3D vascular structure in the 3D model is known, i.e., all (or at least some) of the component parts of the vascular tree are known and can be named (annotated).

In an example, the processing unit is configured to determine a 2D projection of the 3D model of the body part, the 2D projection of the body part comprising a 2D projection of the 3D modelled vascular structure.

In an example, taking the heart as an example of a body part, the vascular structure in the 2D X-ray image then corresponds to a 2D coronary tree, and in this example the 2D coronary tree is segmented. An example of an image processing method based on an extension of which filters for building a (continuous) vessel energy map that is then thresholded to get a segmentation can be found in the following reference: "Improved vessel enhancement for fully automatic coronary modelling". V. Auvray, U. Jandt, R. Florent, D. Schäfer. SPIE Medical imaging 2009. In an example, the 3D model of the body part is additionally exploited in the segmentation to convey information on the expected position of vessels, and on the "impossible" positions of vessels.

In an example, well-defined branches of the vascular structure in the 2D X-ray image are identified. In an example, well-defined branches of the vascular structure in the 2D X-ray image are identified, and the remaining branches are removed from further analysis from this 2D X-ray image (angiogram).

In an example, the processing unit is configured to determine a 2D projection of the 3D model of the body part, the 2D projection comprising a 2D projection of the 3D modelled vascular structure. In this manner, when the 3D model is appropriately orientated such that its pose is the same as that for a body part, e.g. a heart, during X-ray examination (e.g. angiogram), then the 2D projection provides an easily interpretable modelled output that has a vascular structure that will correspond to the vascular structure in the angiogram.

In an example, the processing unit is configured to generate a 3D model of the body part, e.g. heart, that can be inserted into a digital medical report. In this manner, within the digital report, for example when a reader views an angiogram, the associated 3D model of the heart can orientate itself to the same orientation as the heart when the angiogram was taken. Within the digital report, the 3D model can also generate the 2D projection of the 3D model, that matches an angiogram being viewed such that the vascular structure in the angiogram can be more easily interpreted from the 2D modelled projection.

According to an example, the processing unit is configured to confront the 3D modelled vascular structure with the 2D X-ray image data of the vascular structure. The processing unit is configured to determine a 2D projection of the 3D model of the body part, the 2D projection of the 3D model of the body part comprising a 2D projection of the 3D modelled vascular structure. The processing unit is configured to adapt the at least one parameter such that a 2D projection of the adapted 3D modelled vascular structure is representative of the 2D X-ray image data of the vascular structure of the patient's body part. The adapted at least one parameter forms the determined at least one parameter.

In an example, the processing unit is configured to adapt the 3D model based on the adapted at least one parameter and to adapt the 3D vascular structure and to determine a 2D projection of the adapted 3D model of the body part.

In an example, the parameters of the 3D model, including the pose as discussed above, are varied in order to warp the 3D model and its 2D projection of the 3D vascular structure, until the warped 2D projection of the 3D vascular structure best matches the actual angiogram. The new parameters of the 3D model are now the determined parameters of the improved model. This process can then be performed from an angiogram taken from a different perspective, and where the model is then viewed from that same perspective. Alternatively, the parameters can be varied and immediately confronted to the whole corpus of 2D angiograms. The set of parameters yielding the best alignment will be chosen. In such a situation the "internal" parameters of the model can be the same for every angiogram, but the "external" pose parameters can be different for each angiography.

In other words, an optimisation process is performed on the at least one parameter of the 3D model so that a 2D projection of that model matches the observed angiography. To put this in another way, this optimisation process is similar to processes used for 3D/2D registration. Information relating to the matching of the 2D projection of the model to an angiogram can be found in the following two references: 1) "Projection based motion compensation and reconstruction of coronary segments and cardiac implantable devices using rotational X-ray angiography", Gert Schoonenberg, Raoul Florent, Pierre Lelong, Onno Wink, Daniel Ruijters, John Carroll, Bart ter Haar Romeny, Medical Image Analysis, Volume 13, Issue 5, October 2009, pages 785-792; and 2) "Model-based segmentation of the left main coronary bifurcation from 2D angiograms", R. Lacroix, R. Florent, V. Auvray, ISBI 2012.

In an example, adapting the at least one parameter comprises defining an energy function that characterises how well the current 2D projection of the 3D modelled vascular structure matches the 2D X-ray image data of the vascular structure (e.g. coronary tree in the angiogram).

In an example, defining an energy function comprises computing a vessel energy map by filtering the angiogram, and sum the vessel energy overlapped to the 2D projection of the 3D modelled vascular structure. If the at least one parameter of the 3D model is such that the 2D projection of the 3D modelled vascular structure corresponds well to the vessels in the angiogram, the energy will be high, if however the at least one parameter of the 3D model is not coherent with the angiogram, there will be no such correspondence and the energy be low. It is to be noted this energy can be computed (sum along reprojected centerline over angiogram vessel energy) on different angiograms simultaneously.

In an example, all possible configurations, up to a sampling coefficient, of the at least one parameter are investigated with associated 2D projection of the 3D model vascular structure being generated, and the one giving the highest energy corresponds to the 3D model having the optimum at least one parameter.

In an example, the energy is differentiable with respect to the at least one parameter, wherein the energy derivatives indicate the direction the at least one parameter should be adapted in order to improve the alignment. Then, a gradient descent will lead quickly to a (locally) optimal choice of the at least one parameter. In this manner, the required at least one parameter can be determined more quickly than for the case where all possible parameters are investigated.

In an example, the vessel energy map is adapted through the application of Gaussian filtering. In this manner, this simple adaptation blurs the energy map, in order to account for the uncertainty that arises from using a generic 3D model to account for the patient 3D coronary tree. The level of blurring can be decreased as the model adaptation progresses, and the current model gets closer to the actual 3D coronary tree of the patient.

Computation of a vessel energy map is described for example in the paper: "Improved vessel enhancement for fully automatic coronary modelling". V. Auvray, U. Jandt, R. Florent, D. Schäfer. SPIE Medical imaging 2009.

In an example, aligning the 2D projection of the 3D model of the body part to the 2D X-ray image data of the vascular structure comprises identifying some specific points (e.g. branching points) in the angiogram by pure 2D image processing. These points then service anchors to set the at least one parameter for the 3D model, so that the selected points in the 2D projection of the 3D modelled vascular structure match the corresponding specific points in the angiogram. In other words, a specific method is designed to align the 2D projection of the 3D modelled vascular structure and the angiogram. An example of such a specific method is described in the paper: "Model-based segmentation of the left main coronary bifurcation from 2D angiograms", R. Lacroix, R. Florent, V. Auvray, ISBI 2012.

In an example, the processing unit is configured to determine the 2D projection of the 3D model of the body part through the use of an image processing unit.

In an example, the processing unit is configured to warp the 2D projection of the 3D modelled vascular structure such that it is representative of the 2D X-ray image data of the vascular structure, to adapt the at least one parameter.

In other words, the 2D projection of the model itself is used by warping the 2D projection until the 2D modelled vascular structure matches the vessel structure in the angiogram. The motion parameters used in the warping will then directly translate into the at least one parameter of the 3D model that would result in the warped 2D projection of the 3D modelled vascular structure, thereby enabling the adapted at least one parameter to be determined.

According to an example, the processing unit is configured to modify the at least one parameter until the 2D projection of the modified 3D modelled vascular structure is representative of the at least 2D X-ray image data of the vascular structure, to adapt the at least one parameter.

In an example, the processing unit is configured to register the 2D projection of the 3D model of the body part to the 2D X-ray image data of the vascular structure, to adapt the at least one parameter.

In an example, registration of the 2D projection of the 3D model of the body part comprises registration of the 2D projection of the 3D modelled vascular structure to the 2D X-ray image data of the vascular structure.

The term "registration" relates to a transform of the 3D model of the body part such that the 2D projection of the 3D modelled vascular structure has a vessel tree that spatially corresponds to a vessel tree in the 2D X-ray image data of the vascular structure. In other words, the at least one parameter is varied or adapted until the vascular structure in the 2D projection of the 3D modelled vascular structure is optimally similar to that of the 2D X-ray image data of the vascular structure, or in other words the vessels in both the real X-ray image and the modelled image are as similar as possible.

In an example, the processing unit is configured to adapt the at least one parameter such that a first part of the vascular structure in the 2D projection of the adapted 3D modelled vascular structure is aligned with a corresponding first part of the vascular structure in the 2D X-ray image data of the vascular structure and a at least a second part of the vascular structure in the 2D projection of the adapted 3D modelled vascular structure is aligned with a corresponding at least a second part of the vascular structure in the 2D X-ray image data of the vascular structure.

For example, a position in the 2D projection of the 3D modelled vascular structure is translated into a position into the corresponding angiographic image. In an example, at least some features (e.g. A, B, C) in the 2D projection of the 3D modelled vascular structure are aligned with or projected onto at least some similar features (e.g. A', B', C') in the at least one 2D X-ray image (angiogram). The features A, B, C in the 2D projection of the 3D modelled vascular structure may not initially match with the features A', B' C' in the angiogram, and the at least one parameter is then adapted until the features do match. This will result in a change in the branching structure in the 3D model that more closely matches the branching structure in the patient's heart. In other words, the appearance of the 3D modelled vascular structure will closely match that of the patient's heart. In an example, the aligning may comprise a region of the 2D projection of the 3D modelled vascular structure being placed over the top of the equivalent region of the at least one 2D X-ray image (angiogram).

According to an example, the processing unit being configured to confront the 3D modelled vascular structure with the 2D X-ray image data of the vascular structure comprises the processing unit being configured to transform the 3D model of the body part, wherein the transform of the 3D model of the body part comprises a determination of the pose of the 3D model of the body part.

In an example, the determination of the pose of the 3D model is carried out until a 2D projection of the transformed 3D modelled vascular structure is representative of the 2D X-ray image data of the vascular structure of the patient's body part.

In this manner, the 3D modelled vascular structure can then be confronted with the 2D X-ray image data of the vascular structure to determine the at least one parameter to improve the model, with respect to a 3D model orientated and positioned with the same angulation as that for the angiogram. In other words, the 3D model may need to be rotated and/or translated in space such that the view through the 3D model is similar to the route the X-rays took through the body part in creating the 2D X-ray image data of the vascular structure (angiogram). In an example, following transformation of the 3D model, such that it is positioned with the same angulation as that for the angiogram (2D X-ray image data of the vascular structure), the 2D projection of the 3D modelled vascular structure can then be warped to match that of the 2D X-ray image data of the vascular structure through appropriate adaptation of the at least one parameter that commands the appearance of the 3D model. Another angiogram (2D X-ray image data of the vascular structure) can then be selected, which could relate to X-rays having passed through the heart from a different direction to the first angiogram. The initially improved 3D model can then similarly be transformed (rotated and/or translated in space) such that a 2D projection of the 3D model vascular structure is similar to the other angiogram (the 3D model is at the same angulation as the heart for the new angiogram) and the initially improved 3D model can be warped through variation of the at least one parameter as discussed above in order to further improve the 3D model. This process can be repeated for angiograms taken from various directions to the heart, leading to a patient specific 3D model of the heart.

In other words, the "internal parameters" of the 3D model can be determined in order that the 3D model matches the patient's body part, e.g. heart, and the pose—i.e., the "external parameter" relating to the orientation of the 3D model can be determined in order that the patient specific model can be appropriately oriented for providing information for inserting into a medical report. For example, providing the 3D model at the same pose as that for the patient's heart when an angiogram was taken such that a 2D projection of the 3D model provides a synthetic vascular structure that is patient specific and that matches the vascular structure in the angiogram. This could be used to interpret the angiogram. Or, the pose could relate to providing a 3D model that can be inserted into a digital report and where the orientation of the for example modelled heart automatically orients itself within the digital report to that of the angiogram being examined.

In an example, during acquisition of angiograms, the 3D model can be progressively adapted as each angiogram is acquired during a scan.

In an example, all the angiograms for a patient will already have been acquired when a patient specific 3D model is determined. In such an example, all the angiograms can be considered when the at least one parameter is determined. In this manner, an optimum can be arrived at more quickly and there may be less chance of falling into a local minimum that does not actually represent the global optimum.

To put this another way, in an example the 3D model of the body part can be transformed, such as rotated, and/or translated such that a 2D projection of the 3D vascular structure of the 3D model looks as similar as possible to that to the angiogram (2D X-ray image of the vascular structure). In this manner, the patient's heart, when the angiogram was taken, is in a similar position and orientation to that for the 3D model leading to the 2D projection of the 3D modelled vascular structure. This means that adapting the at least one parameter such that a 2D projection of the adapted 3D modelled vascular structure is representative of the 2D X-ray image data of the vascular structure leads to a change in the appearance of vascular structure of the model that most closely correlates to the appearance of the vascular structure in the patient's heart.

In an example, taking the example of the body part being a heart, an angiogram of the heart may only show a region of the vascular structure in a visible and distinct manner because contrast agent was only injected at that location, or because a subpart of the injected region appeared cluttered, as different vessels overlap. In this situation the at least one parameter being adapted, such that the 2D projection of the adapted 3D model vascular structure is representative of the 2D X-ray image data of the vascular structure, may only relate to parameter(s) defining the appearance of the 3D modelled vascular structure (the coronary structure) over the region where the vascular structure is presented in a visible and distinct manner. Another angiogram, taken at the same angulation as first angiogram, may have contrast agent that has been injected into another region of the vascular structure such that that of the region is presented in a visible and distinct manner, and an angiogram taken from a different perspective can show, in certain situations, in a visible and distinct manner the subtree that was cluttered in the other view. The parameters that define the appearance of the 3D modelled vascular structure at this location can then be adapted. In this manner, angiograms at the same angulation and a different angulations can be used to progressively adapt the at least one parameter in order to progressively improve the model towards a patient specific 3D model of the body part. In other words, in an example one angiogram may relate to injection of the left coronary tree and a second at the same angulation relate to an injection of the right coronary tree.

In an example, the processing unit is configured to transform the 3D model of the body part through the use of an image processing unit.

In an example, the transform comprises the processing unit being configured to align at least one part of the vascular structure in the 2D X-ray image data with a corresponding at least one part of the vascular structure in the 2D projection of the 3D model vascular structure. For example, a position in a 2D projection of the 3D modelled vascular structure is translated into a position into the corresponding angiographic image. In an example, at least some features (e.g. A, B, C) in the 2D projection of the 3D modelled vascular structure are aligned with or projected onto at least some similar features (e.g. A', B', C') in the at least one 2D X-ray image (angiogram). In an example, the aligning may comprise a region of the 2D projection of the 3D modelled vascular structure being placed over the top of the equivalent region of the at least one 2D X-ray image (angiogram).

In an example, refinement of the pose of the 3D model comprises progressively affining the 3D position of the 3D model so that the 2D projection of the 3D modelled vascular structure matches the coronary tree, as it is observed on the 2D X-ray image (angiogram), as well as possible.

In an example, affining comprises defining an energy function that characterises how well the current 2D projection of the 3D modelled vascular structure matches the coronary tree in the angiogram.

In an example, defining an energy function comprises computing a vessel energy map by filtering the angiogram, and summing the vessel energy overlapped to the 2D projection of the 3D modelled vascular structure. If the pose of the 3D model is such that the 2D projection of the 3D modelled vascular structure corresponds well to the vessels in the angiogram, the energy will be high, if however the pose of the 3D model does not lead to a correctly orientated 3D model, there will be no such correspondence and the energy be low. In an example, all possible poses, up to a sampling factor, are investigated with associated 2D projections of the 3D model vascular structure being generated, and the one giving the highest energy corresponds to the 3D model having the best pose.

In an example, the energy is differentiable with respect to the pose parameters (translations, and rotations, wherein the energy derivatives indicate the direction the pose parameters should be adapted in order to improve the alignment. In other words, a gradient descent will lead quickly to a (locally) optimal choice of the pose. In this manner, the required pose can be determined more quickly than for the case where all possible poses are investigated.

In an example, the vessel energy map is adapted through the application of Gaussian filtering. In this manner, this simple adaptation blurs the energy map, in order to integrate the inaccuracy on the model with respect to the real coronary tree.

In an example, registration of the 2D projection of the 3D model of the body part to the 2D X-ray image data of the vascular structure comprises identifying some specific points in the angiogram by pure 2D image processing (for instance, branching points). These points then service anchors to set the pose parameters for the 3D model, so that the points in the 2D projection of the 3D modelled vascular structure match the corresponding specific points in the angiogram. In other words, a specific method is designed to align the 3D model and the angiogram.

In an example, the transform of the 3D model of the body part comprises rotation of the 3D model of the body part. In an example, the rotation comprises rotation around an x, y, or z axis. In an example, the transform of the 3D model of the body part comprises translation of the 3D model of the body part. In an example, the translation comprises translation along an x, y, or z axis.

According to an example, the input unit is configured to provide information relating to a geometrical configuration of an X-ray acquisition unit 40 that was used to acquire the at least one 2D X-ray image, and wherein the transform of the 3D model of the body part comprises utilization of the information relating to the geometrical configuration of the X-ray acquisition unit.

In an example, information relating to the geometrical configuration comprises angulation and source to image distance SID of the X-ray acquisition unit. In an example, the 3D model is initially positioned at the isocenter, for example according to the C-arm geometry.

In an example, the transform of the 3D model of the body part comprises a registration of the 2D projection of the 3D model of the body part to the 2D X-ray image data of the vascular structure. In an example, registration of the 2D projection of the 3D model of the body part comprises registration of the 2D projection of the 3D modelled vascular structure to the 2D X-ray image data of the vascular structure. The term "registration" here relates to a transform of the 3D model of the body part such that the 2D projection of the 3D modelled vascular structure has a vessel tree that spatially corresponds to a vessel tree in the 2D X-ray image data of the vascular structure. In other words, the 3D model is rotated and/or translated until the vascular structure in the 2D projection of the 3D modelled vascular structure is similar to that of the 2D X-ray image data of the vascular structure, or in other words the vessels in both the real X-ray image and the synthetic modelled image images are as similar as possible for that model. At this point, the 3D model has an orientation and position, with respect to its 2D projection, that is representative of the orientation and position of the heart that led to the angiogram. In this manner, the 3D modelled vascular structure can then be confronted with the 2D X-ray image to determine the at least one parameter.

According to an example, the processing unit is configured to enable a user to annotate the at least one 2D projection of the 3D modelled vascular structure associated with the transformed 3D model of the body part, and wherein the processing unit is configured to apply the annotation to the 3D modelled vascular structure of the 3D model of the body part.

In an example, an annotation unit 50 or annotation module 50 is configured to enable a user to annotate the at least one 2D projection of the 3D modelled vascular structure associated with the transformed 3D model of the body part, and wherein the processing unit or the annotation unit or annotation module is configured to apply the annotation to the 3D modelled vascular structure of the 3D model of the body part.

According to an example, the processing unit is configured to enable a user to select a reporting format for reporting the at least one 2D projection of the 3D modelled vascular structure associated with the transformed 3D model of the body part, and/or the 3D modelled vascular structure associated with the transformed 3D model of the body part and/or the transformed 3D model of the body part.

In an example, a reporting unit 60 or reporting module 60 is configured to enable a user to select a reporting format for reporting the at least one 2D X-ray image and/or the 2D projection of the 3D modelled vascular structure associated with the transformed 3D model of the body part, and/or the 3D modelled vascular structure associated with the transformed 3D model of the body part and/or the transformed 3D model of the body part.

In an example, the processing unit is configured to automatically rotate the 3D model with angiograms that are viewed, such that the 3D model is presented at the same angulation as that for the angiogram being viewed.

According to an example, the processing unit is configured to confront the 3D modelled vascular structure with the 2D X-ray image data of the vascular structure. The processing unit is configured to indicate at least one segment of the vascular structure in the at least one 2D X-ray image of the vascular structure. The processing unit is configured to perform at least one measurement on the at least one segment and associate the at least one segment of the vascular structure in the at least one 2D X-ray image of the vascular structure with a corresponding at least one segment of the 3D modelled vascular structure. The processing unit is configured to adapt the at least one parameter as a function of the at least one measurement. The adapted at least one parameter forms the determined at least one parameter.

In an example, the vessel segments visible on the angiography are identified, in order to explicitly associate them with the segments of the model.

In other words, some measurements are performed for these segments on the 2D X-ray image (segment length, thickness, tortuosity), which in turn allows the model parameters (the at least one parameter) to be set (adapted) for the considered segments. In an example, no 2D projection of the 3D model of the body part is required. In an example, no image registration is required.

In example, coronary segments in the angiogram are identified. In an example, a 2D vascular segmentation of the angiogram is undertaken. In an example, labelling of the 2D vascular segmentation of the angiogram is undertaken. Information regarding performing vessel segmentation can be found for example in the following paper: "A review of vessel extraction techniques and algorithms", C. Kirbas and F. Quek, ACM Computing surveys, vol 36 no 2 pp. 81-121, 2004.

In an example, 2D vascular segmentation of the angiogram comprises filtering the angiogram (the 2D X-ray image of the vascular structure) by a vessel enhancement method, and then threshold it. An example of a vessel enhancement method can be found for example in the following paper: "Improved vessel enhancement for fully automatic coronary modelling". V. Auvray, U. Jandt, R. Florent, D. Schäfer. SPIE Medical imaging 2009.

In an example, identifying segments in the 2D X-ray image of the vascular structure (e.g. coronary segments in the angiogram) comprises utilisation of machine learning.

In an example, utilisation of machine learning comprises association of metrics with vessel points in the 2D X-ray image of the vascular structure (angiogram). The metrics can comprise: vessel energy; position in the angiogram; angulation of the system when acquiring the angiogram; vessel thickness; neighbouring vessels. In an example, a ground truth is determined specifying which branch each vessel point belongs to. In an example, utilisation of machine learning comprises correlating a coronary segment in the 2D X-ray image of the vascular structure with the metrics. In an example, the correlating leads to the generation of learned rules. In this manner, when a new angiogram is considered the learned rules are applied to all the segmented points in order to decide which segment is present where in the angiogram. It is then straightforward to compute distances between bifurcations in the 3D modelled vascular structure, to decide on different branching alternatives and set the branch orientations leading to an updated 3D model, the 2D projection of which would now be coherent with the angiogram under consideration if the 3D model was orientated such that it had the same angulation as that for the angiogram.

In an example, the processing unit being configured to indicate at least one segment of the vascular structure in the at least one 2D X-ray image of the vascular structure comprises the exploitation of machine learning to classify positions along the centreline of the vessels.

In an example, the at least one measurement comprises a measurement of one or more of: segment length; segment thickness; segment tortuosity; how the segments are branched together; and where the bifurcation is located on the main arteries.

In an example, the processing unit is configured to enable a user to annotate the at least one 2D X-ray image and/or a 2D projection of the 3D modelled vascular structure associated, and wherein the processing unit is configured to apply the annotation to the 3D modelled vascular structure of the 3D model of the body part.

According to an example, the at least one 2D X-ray image comprises a plurality of images; wherein, the processing unit is configured to select a well injected 2D X-ray image from the plurality of images.

In an example, contrast agent is present during the acquisition of the well injected 2D X-ray image. For example, contrast agent has been injected into at least a part of the vascular structure in order to provide image data of the vascular structure in a visible and distinct manner. In other words, in the well-injected image the injected arteries, for example coronary arteries, are nicely visible. The term "visible and distinct" with respect to the at least a part of the vascular structure relates to at least part of the vascular structure being presented such that the vascular structure can be located and/or identified and/or delineated, either manually or automatically. The imagery can be visible and distinct due to contrast agent having been injected into the vascular structure at the time of image acquisition, for example during X-ray angiography.

In an example, the at least one 2D X-ray image comprises a plurality of images; wherein, the processing unit is configured to select a first 2D X-ray image and a second 2D X-ray image from the plurality of images, where the processing unit is configured to select the second 2D X-ray image as an image that is a correlated image with respect to the first 2D X-ray image.

The term "correlated image" relates to selection of the second 2D X-ray image such that it is correlated with respect to the first 2D X-ray image. For example, the first and second 2D X-ray images can be correlated with respect to cardiac cycle. In other words, the body part (for example the heart) will be expected to be in a similar state between the two images. This leads to a spatially corresponding vessel tree between the heart that resulted in the first 2D X-ray image and the heart that resulted in the second 2D X-ray image. In other words, the 2D X-ray images, which could relate to different angulations through the heart, are then optimally useable to enable the at least one parameter to be determined when confronting the 3D model with the 2D X-ray images of the vascular structure. This provides for a simplification, because a 3D model of the heart does not then need to be dynamic, in terms of changing with cardiac cycle as X-ray images can be selected that relate to a fixed moment in time within a cardiac cycle, breathing cycle etc.

In an example, an X-ray acquisition unit 40 that was used to acquire the at least one 2D X-ray image was static at the time the at least one 2D X-ray image was acquired.

In an example, the apparatus comprises an output unit, wherein, the output unit is configured to output data representative of the at least one 2D X-ray image and is configured to output data representative of a 2D projection of the 3D modelled vascular structure.

Figure 2:
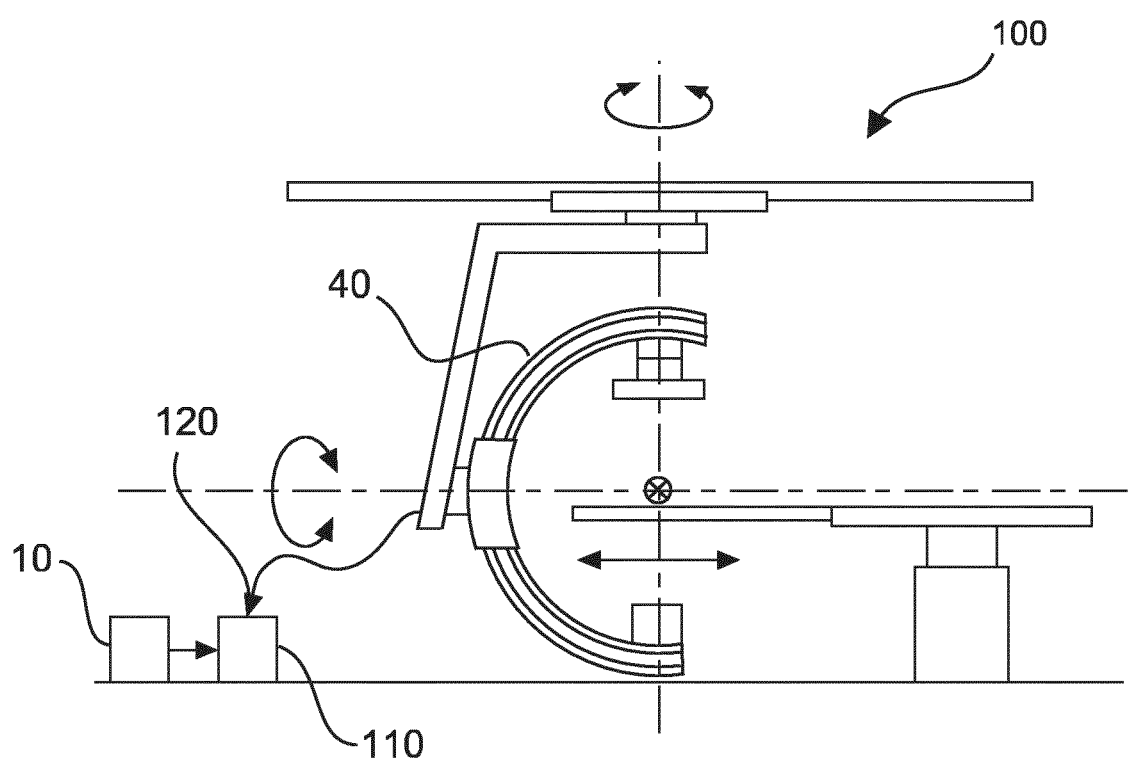
FIG. 2 shows a schematic set up of an example of a medical system for providing a patient specific 3D model of a body part.

FIG. 2 shows an example of a medical system 100 for providing a patient specific 3D model of a body part. The system comprises an X-ray image acquisition unit 40, an apparatus 10 for providing a patient specific 3D model of a body part according to the above described FIG. 1, and an output unit 110. The X-ray image acquisition unit 40 is configured to provide the at least one 2D X-ray image to the apparatus via communication cable 120. The apparatus 10 communicates with the output unit 110 via appropriate communication cabling, and the output unit 110 is configured to output data representative of the patient specific 3D model of the body part.

In an example, the output unit is configured to output data representative of the 2D projection of the 3D modelled vascular structure. In an example, the output unit is configured to output data representative of the 2D X-ray image. In an example, the output unit is configured to output the at least one 2D X-ray image, and to output an image of the 2D projection of the 3D modelled vascular structure.

In an example, the X-ray image acquisition unit comprises an X-ray imaging device. In an example, the X-ray image acquisition unit comprises a fluoroscopic imaging device, for example, a fluoroscopic low-dose X-ray device. In an example, the X-ray image acquisition unit comprises an angiographic imaging device.

In an example, the output data is useable to enable a clinician to determine whether a vascular treatment or intervention was successful.

In an example, the system is used for Percutaneous Transluminal Coronary Angioplasty (PTCA) in catheter laboratories, to treat cardiac stenosis.

Figure 3:
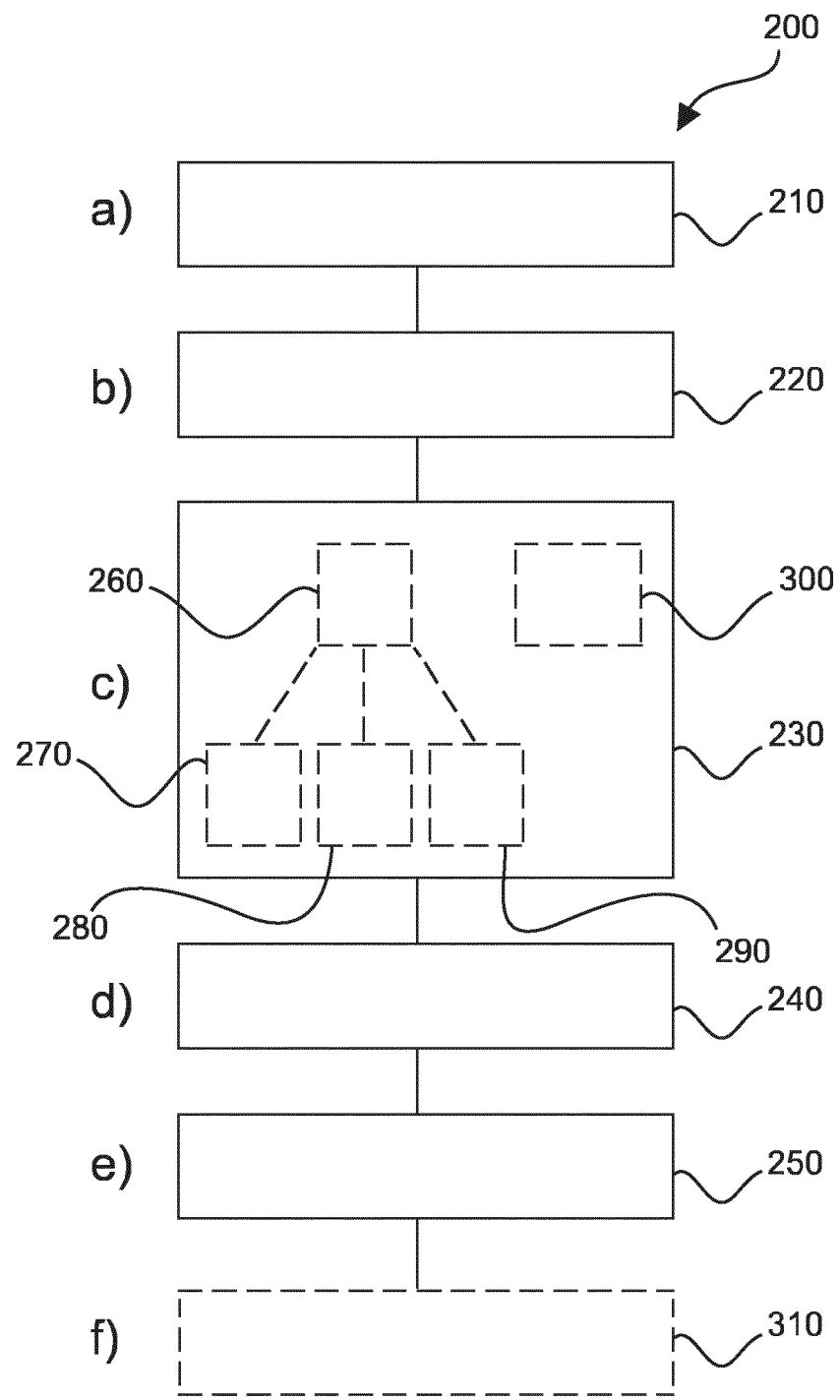
FIG. 3 shows an example of a method for providing a patient specific 3D model of a body part.

FIG. 3 shows an example of a method 200 for providing a patient specific 3D model of a body part in its basic steps. The method comprises the following:

In a first providing step 210, also referred to as step a), at least one 2D X-ray image comprising 2D X-ray image data of a vascular structure of a patient's body part is provided.

In a second providing step 220, also referred to as step b), a 3D model of the body part is provided, the 3D model comprising a 3D modelled vascular structure, wherein at least one parameter commands an appearance of the 3D modelled vascular structure.

In a confronting step 230, also referred to as step c), the 3D modelled vascular structure is confronted with the 2D X-ray image data of the vascular structure to determine the at least one parameter.

In an updating step 240, also referred to as step d), the 3D model is updated as a function of the determined at least one parameter.

In a generating step 250, also referred to as step e), a medical report is generated based on information determined from the 3D model.

In an example, step c) comprises determining 260 a 2D projection of the 3D model of the body part, the 2D projection of the 3D model of the body part comprising a 2D projection of the 3D modelled vascular structure, and step c) further comprises adapting 270 the at least one parameter such that a 2D projection of the adapted 3D modelled vascular structure is representative of the 2D X-ray image data of the vascular structure of the patient's body part, wherein the adapted at least one parameter forms the determined at least one parameter.

In an example, adapting the at least one parameter comprises modifying the at least one parameter until the 2D projection of the modified 3D modelled vascular structure is representative of the 2D X-ray image data of the vascular structure. In an example, adapting the at least one parameter comprises registering the 2D projection of the 3D model of the body part to the 2D X-ray image data of the vascular structure.

In an example, step c) comprises transforming 280 the 3D model of the body part comprising a refinement of the pose of the 3D model of the body part.

In an example, the step c) comprises providing 290 information relating to the geometrical configuration of an X-ray acquisition unit that was used to acquire the at least one 2D X-ray image. In an example, confronting the 3D modelled vascular structure with the 2D X-ray image data of the vascular structure comprises utilization of the information relating to the geometrical configuration of the X-ray acquisition unit. In an example, transforming the 3D model of the body part comprises utilization of the information relating to the geometrical configuration of the X-ray acquisition unit.

In an example, step c) comprises indicating 300 at least one segment of the vascular structure in the at least one 2D X-ray image of the vascular structure and performing at least one measurement on the at least one segment and associating the at least one segment of the vascular structure in the at least one 2D X-ray image of the vascular structure with a corresponding at least one segment of the 3D modelled vascular structure; wherein adapting the at least one parameter is carried out as a function of the at least one measurement; and wherein the adapted at least one parameter forms the determined at least one parameter.

In an example, the method comprises step e) enabling 310 a user to select a reporting format for reporting the at least one 2D X-ray image and/or a 2D projection of the 3D modelled vascular structure, and/or the 3D modelled vascular structure and/or the 3D model of the body part.

In an example, the at least one 2D X-ray image comprises a plurality of images; and wherein the method comprises selecting a well injected 2D X-ray image from the plurality of images.

In an example, the at least one 2D X-ray image comprises a plurality of images; and wherein the method comprises selecting a first 2D X-ray image and a second 2D X-ray image from the plurality of images, wherein where the second 2D X-ray image is selected as an image that is a correlated image with respect to the first 2D X-ray image.

Examples of the apparatus and method for providing a patient specific 3D model of a body part will now be described in more detail in conjunction with FIGS. 4-8.

Figure 4:
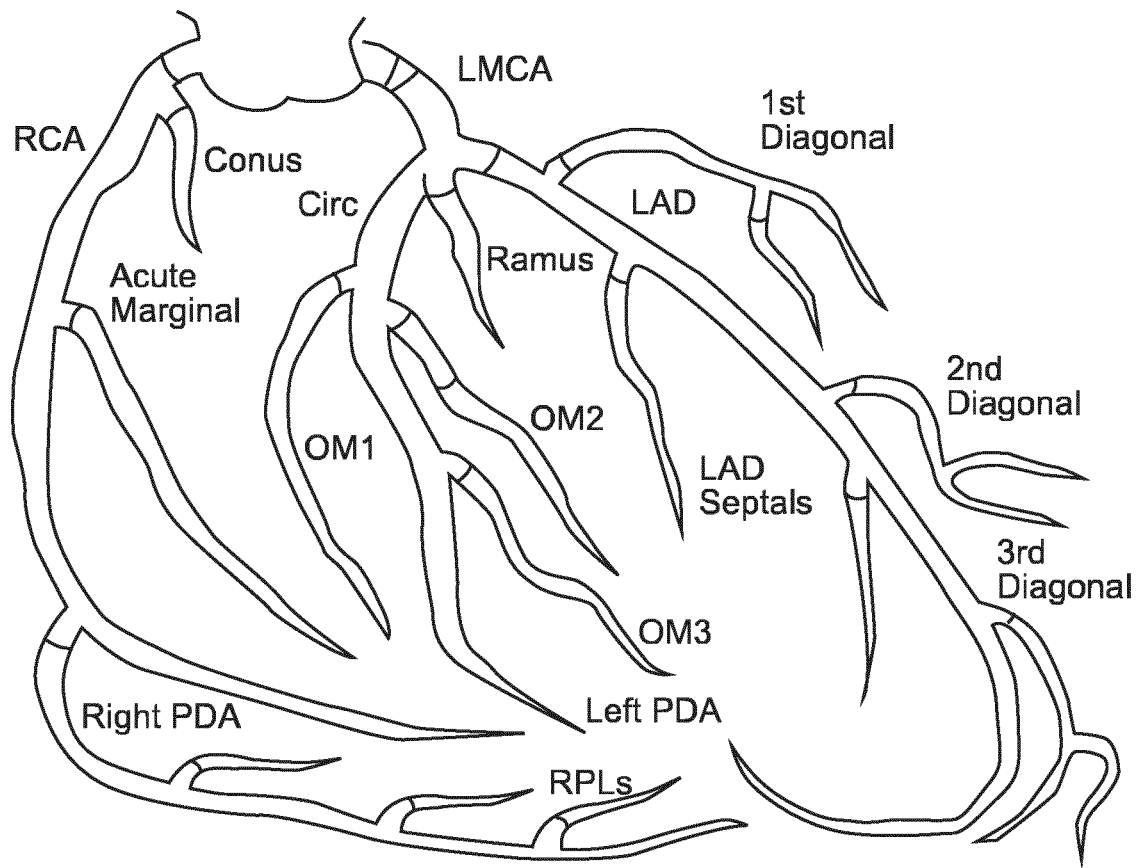
FIG. 4 shows an example of a flattened coronary diagram.

An issue being addressed is reviewed by reference to FIG. 4. FIG. 4 shows an example of a flattened coronary diagram. In order to be able to represent every possible coronary tree, by essence complex 3D structures, the coronary diagram has to be very schematic. For example, the right and left coronary trees are flattened and presented side by side. The course of the secondary branches (marginal, septals, diagonals . . . ) is primarily dictated by the need to keep the diagram readable by voiding overlaps. This representation is by essence schematic, and therefore far from the actual structure and course of the arteries as observed on the angiographic images.

As a result, it is not straightforward to relate such generic artery models with the observed angiographic images. Filling in the diagram requires an effort from the clinician while he mentally needs to project the injected vessels he observed on the exam sequences to an anatomical (semantic) model, and then back onto the generic diagram.

With continued reference to the issue being addressed with reference to FIG. 4, the strongest deviation between generic artery model and reality (the observed angiogram images) regards the structure of the coronary branching:

The posterior descending artery (PDA) can be either attached to the right coronary (65% of the cases), to the left (10%) or both (co-dominant, 25% of the cases);

A third branch, the ramus, exists in 15% of the cases;

The conus branch may arises directly from the aorta (20-30% of the cases), from the circumflex artery (10%) or from the right coronary artery (60-70%);

Many other abnormalities regard less than 1% of the patients.

Furthermore, the positions of the bifurcations joining the different vessel segments vary a lot from one patient to another. For instance:

The first diagonal can be as close to the Circ/LAD bifurcation that it changes it in a virtual trifurcation, or it can lie many centimeters from the Circ/LAD bifurcation;

The LM can vary so much in length that the Circ and LAD can directly initiate from the aorta.

Furthermore, the branches, in particular the secondary vessels, can vary a lot in significance. For example, in some cases, the second diagonal can have a thickness comparable to the distal LAD, while it appears fine and thin on other patients.

As a result, the clinician needs in a first step to manually adapt the generic artery model to the real structure of the patient anatomy. Then, in order to fill in his findings in the report, he needs to mentally project the injected vessels he observed on the exam sequences into a very generic diagram, where bifurcations position and vessel significance are incorrect. This process is cumbersome and can lead to error. Additionally, ambiguities can arise when a second clinician will perform the reverse task when he will need to read and understand the report, especially when a detailed understanding of the exact position of the stenosis will be needed.

The issue as outlined with reference to FIG. 4, can be addressed by automatically exploiting the angiographic sequences acquired during the exam in order to adapt the coronary diagram, making it patient specific. This reduces the gap that exists between the observed angiographies and the coronary diagram, allowing a more intuitive and more accurate annotation. Moreover, the interpretation of such a report is easier, and leads to less misunderstandings. Finally, this frees the clinician of the manual selection of a specific anatomy. It is to be noted that by relying on the angiographic sequences acquired during the exam, a CT of the heart of the patient does not have to be acquired (which is rare in the clinical routine).

Instead of displaying one artificially flattened complete 2D diagram, a complete 3D diagram of the vascular structure is utilised, which is reprojected into a series of 2D diagrams similar to the acquired angiographies.

Figure 8:
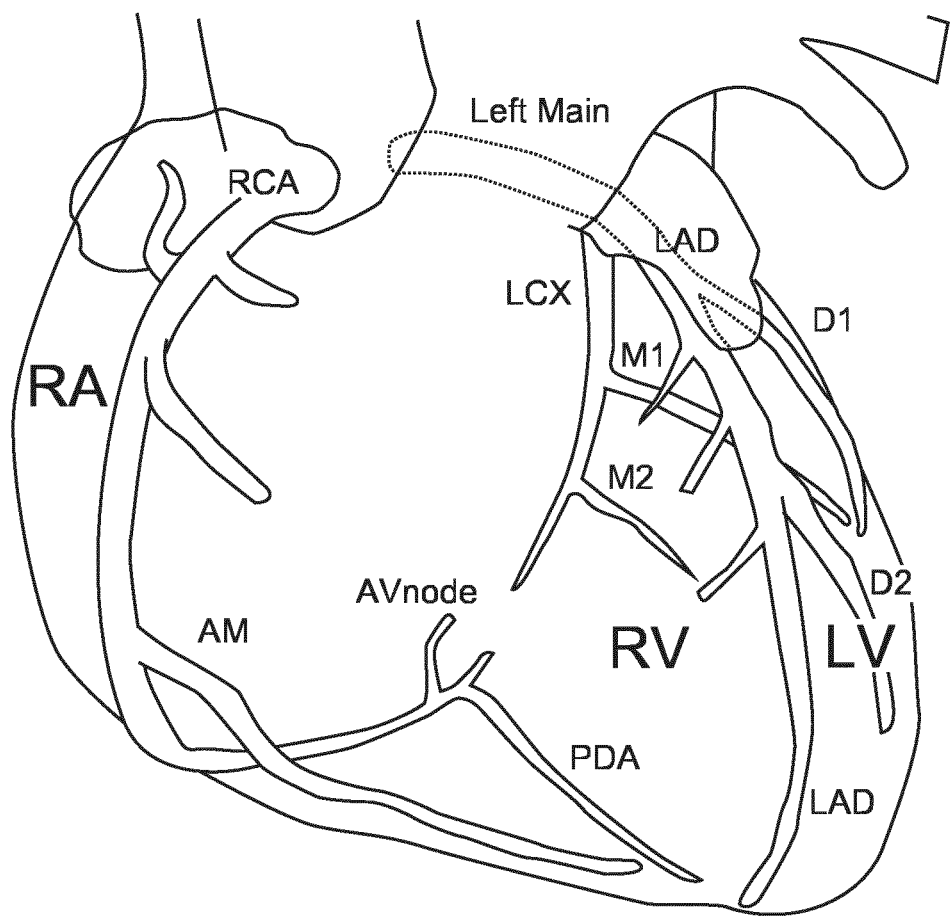
FIG. 8 shows an example of a 3D model of a body part.

In more detail, a 3D geometrical model of the coronary arteries is utilised. It decomposes the artery trees in the same anatomical segments as the 2D flattened model of FIG. 4. An example of a 3D model of a body part, in this example a heart, is shown in FIG. 8. More information on 3D models of body parts can be found in the following report: "Intrathoracic spatial location of specified coronary segments on the normal human heart. Applications in quantitative arteriography, assessment of regional risk and contraction, and anatomic display," J. T. Dodge Jr, B. G. Brown, E. L. Bolson, and H. T. Dodge, Circulation, vol. 78, no. 5, p. 1167, 1988.

However, a generic 3D model of the body part can be made more useable in providing accurate information by relying on an underlying 3D model of the coronary arteries, that is progressively adapted based on the observed angiographic sequences.

More precisely, each of the acquired angiographic sequence is confronted to the 2D synthetic image from the reprojected 3D model (from the same perspective). The parameters commanding the appearance of the 3D model (and thus of its 2D projection) are adapted in order to reduce the difference observed between the angiographic image and the 2D projection of the 3D model. This adaptation is performed successively on each angiographic sequence, or could be performed simultaneously on different angiographic sequences.

Finally, the resulting patient-specific coronary model will be transformed into a form suitable for the report. It can be a flattened 2D model, with correct anatomy, branching and segment significance. Or it could be the adapted 3D model directly, in the case of a digital report where the user could rotate the model.

Underlying 3D Model

As discussed above, the process is based on a 3D geometrical model of the coronary arteries, which comprises for instance:

The branching relationships (which branch originates from which branch). This is strongly constrained by the anatomy, but as we mentioned some variability exists (coronary tree dominance, position of the conus and of the ramus).

The branch lengths.

The position of the bifurcations (defining different segments over each branch).

Precisions on the radii of the segments.

Precisions on the curvature of the different segments.

In other words, there are parameters that define or command or specify the appearance of a 3D model of the coronary tree, which as well as the "internal" parameters discussed above can relate to "external" parameters such as the position, orientation or pose of the 3D model which enable the 3D model to be used, in its 3D state or when a 2D projection is obtained, to aid in the interpretation of medical data such as an angiogram. In other words, when the parameters are correctly determined the 3D model becomes a 3D patient specific model with respect to the patient and how the patient was positioned or orientated when medical image data (such as an angiogram) was acquired. The model parameters are determined, or estimated, which for a generic 3D model are initially set to some default values, by confronting the model as it stands at that point of the processing to a newly acquired angiographic sequence.

Updating the Model by Comparison with One Angiographic Image.

Different approaches can be used to set the 3D geometric parameters so that the 3D model is made coherent with one given angiography:

One could project the 3D coronary model to form a 2D synthetic angiogram, with the C-arm angulations corresponding to the considered angiography (yielding a 2D diagram corresponding to the view at hand). In other words, knowledge of the positioning of the X-ray source and detector for a particular angiogram is used to orientate the 3D model such that its orientation or pose is similar or the same as that of the patient's heart (with respect to the image acquisition system) when the angiogram was acquired. Then, an optimization process is performed on the 3D geometric parameters so that the 2D diagram matches the observed angiography. An optimization process similar to that used for 3D/2D registration can be performed.

However, there is the possibility that a reprojected 2D diagram of the 3D model could still be quite schematic compared to the real angiogram, if the 3D model is not detailed enough. This could lead to an optimization process that is badly conditioned. Another approach is therefore to identify the vessel segments visible on the angiography, in order to explicitly associate them with the segments of the 3D model. Measurements for these segments on the angiograph image are then performed (e.g., segment length, thickness, tortuosity), which in turn enables the setting of the parameters of the 3D model for the considered segments.

Figure 5:
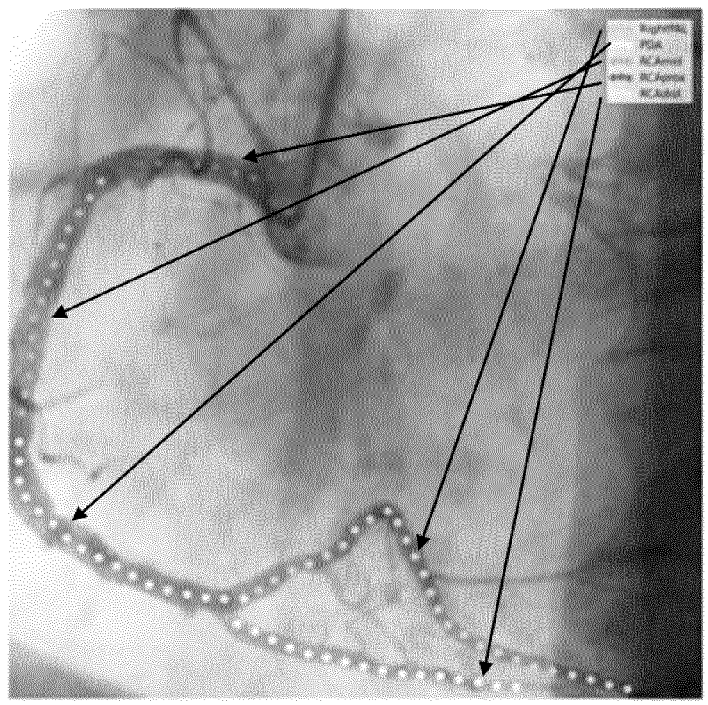
FIG. 5 shows example imagery where 2D segment labeling has been applied as part of providing a patient specific 3D model of a body part.
Figure 5:
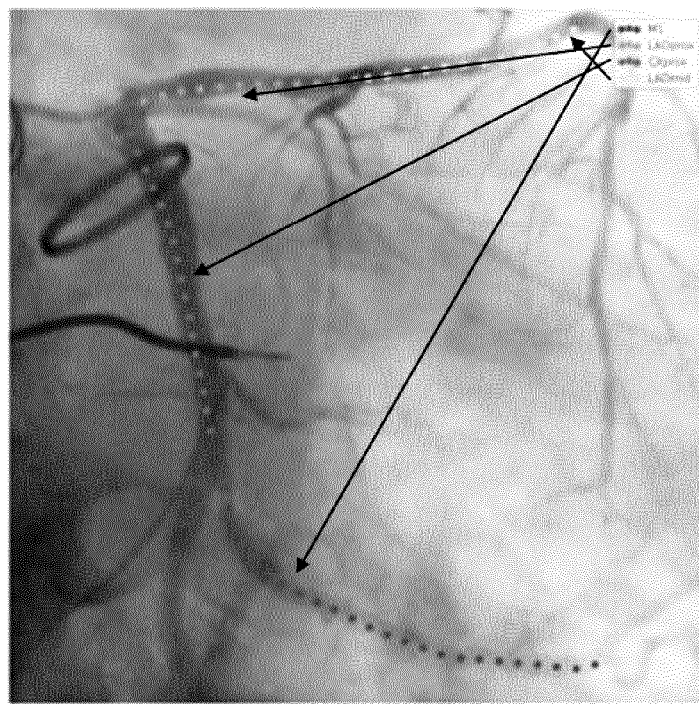
Figure 6:
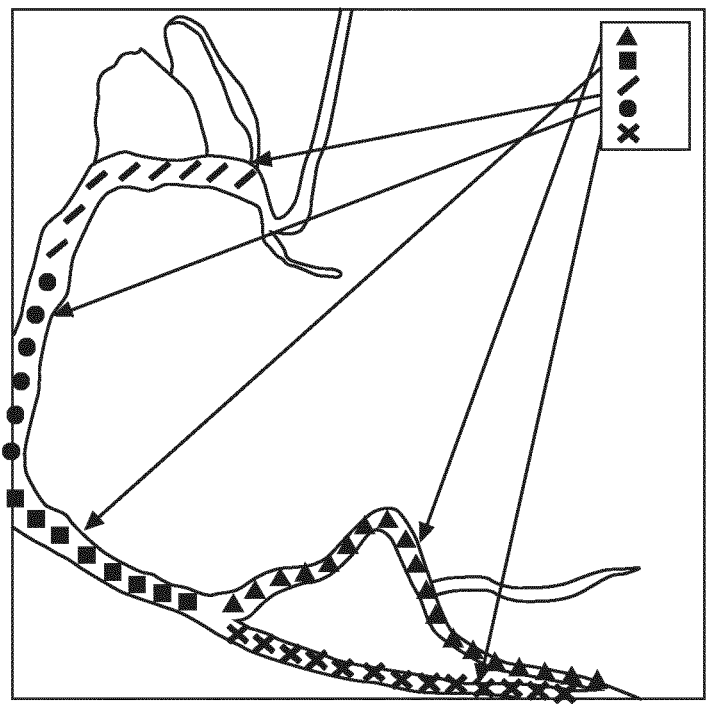
FIG. 6 shows the same information as presented in FIG. 5, but with the image replaced by a schematic diagram representation.
Figure 6:
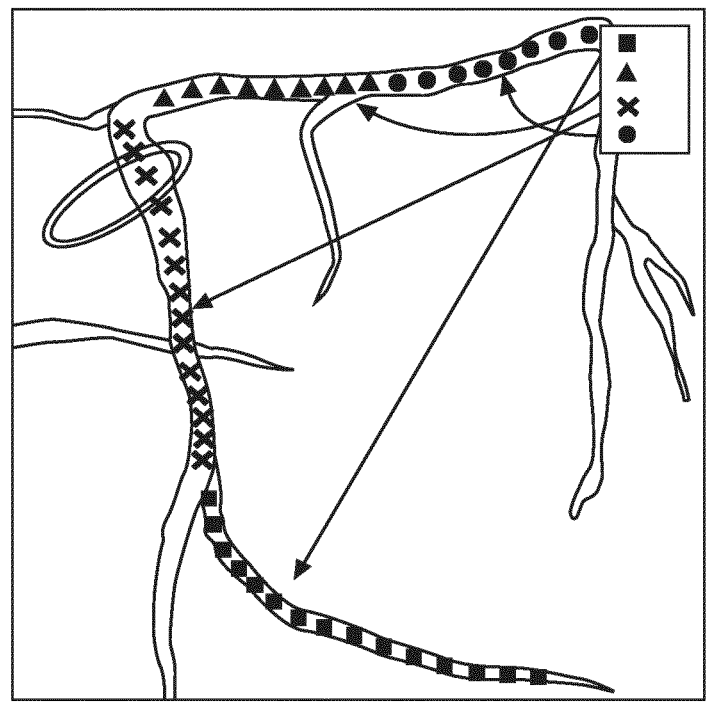

The second approach does not require any projection of the 3D model, nor the registration of images. On the other hand, it requires the identification of coronary segments, which assumes a 2D vasculature segmentation as well as a labelling thereof. An angiogram can be filtered by a vessel-enhancement method, and then thresholded. Regarding the identification of the different segments, machine learning techniques can be used. On a (large) learning database, a large number of metrics are associated to each point of the vessels (vessel energy, position in the image, angulation of the system when acquiring said image, thickness, neighboring vesselnesses, etc), and a ground truth telling which branch each vessel point is belonging to is given. Then, a machine learning algorithm (random forests, deep learning, SVM . . . ) is run that will learn how to correlate the result (anatomical segment) with the features (by ways of combining them, thresholding and linearly adding them). A result of such 2D segment labelisation is shown in FIGS. 5 and 6.

Now, when a new image is considered, the learned rules are applied to all the segmented points, in order to decide which segment is present where in the image. It is then straightforward to compute (reprojected) distances between bifurcations, to decide on different branching alternatives, to set the branches orientations.

As discussed above, the parameters of the 3D model that can be determined to make it patient specific can include the orientation or pose of the 3D model. Now, for each angiographic sequence:

One well injected image is automatically selected from the sequence (where the injected coronary arteries are nicely visible, and if the frames are to belong to the same heart phase then it is the best injected of that given heart phase that is selected). Such a well injected image can be used when updating the "internal" model parameters as discussed above;

The 3D geometrical model is projected to produce a 2D representation, initially positioned at the isocenter, according to the C-arm geometry (defined by its angulation and its Source to image Distance SID);

The pose of the 3D geometrical model is refined so that it corresponds as much as possible to the actually observed injected coronary tree. In an example an improved estimate is computed for the position of the model in space (3 translational parameters), and for a slight rotation (3 parameters).

Starting from an initial pose (the second step), the method is to progressively affine the 3D model position so that its 2D reprojection matches the coronary tree, as it is observed on the 2D image (angiogram), as well as possible. This can be done by defining an energy function that details how well the current reprojected model matches the observed coronaries. For instance, a vessel energy map can be computed by filtering the observed image, and sum the vessel energy overlapped to the reprojected 3D model. If its pose corresponds well to the vessels, the energy will be high; if it is out of the vessels, the energy will be low.

To get with certainty the best possible pose, all admissible transformations can be computed (translations, rotations and scales)—or at least a sampled version of it—and the one giving the highest energy is selected. Alternatively, the energy can be computed such that it is differentiable with respect to the pose parameters, so that the energy derivatives will indicate in which direction the pose parameters should be adapted in order to improve the alignment. In this way, a gradient descent will lead quickly to a (locally) optimal choice of the pose. It is to be noted that, in an example, adaptation of the internal parameters of the model can be performed in the same or similar manner on the basis of differentiable energy, where 2D reprojections are utilized.

An adaptation is to blur the energy map (by Gaussian filtering), in order to translate any imprecision in the model (with respect to the true 3D coronary tree of the corresponding patient) into an imprecision on our matching criterion, in order to facilitate determination of the best possible pose.

Alternatively, a specific method to align the 3D model and the angiogram can be designed, involving explicitly identifying some specific points (e.g. branching points) in the angiogram by pure 2D image processing. These few points will then serve as anchors to set the 3D model (so that the reprojected branching points match the ones extracted from the angiogram).

It is clear that determination of the pose of the 3D model can be used in aiding the determination of the internal parameters of the 3D model, by orientating the 3D model appropriately. For example, information relating to the position of the X-ray image acquisition equipment for a particular image may not be known, or if known it may not have the required fidelity of information to enable the correct orientation of the 3D model to be determined. In that case, the pose can be determined as part of the process of determining the internal parameters of the 3D model, such as the branching relationship of the coronary structure. Furthermore, the above process for determining the pose of a 3D model can be used for a 3D model that has already been determined through the above described processes to be patient specific. This is because, the pose of the 3D model can be determined in order that its 2D projection will match that of an angiogram, or the 3D model itself can be correctly orientated for example in a digital report, such that when an angiogram is digitally viewed the 3D model automatically orientates itself to present the 3D model of the heart as the X-ray image acquisition unit would have viewed it.

In this manner, the 3D model can then be exploited in two modules:

An annotation module, allowing the clinician to transparently and accurately fill in his findings.

The clinician can choose an angiographic image along with an associated 2D projected diagram of the 3D model that he wishes to use to annotate the coronary tree. Editing one of the diagrams (to position a stenosis for instance) will update all of them (since they present all a specific view of the same object—the generic 3D model).

The user can select the most relevant views to report his findings regarding the coronary tree.

Essentially, the user can select the views where the stenoses can be the most clearly seen (little foreshortening, little overlapping clutter) to accurately position them.

A reporting module, allowing the clinician to select the format in which he wants to present that information in the report.

An angiogram, or a series of angiograms, and/or the associated 2D projection(s) of the 3D model can be exported into the report. This will allow a clinician that would read the report to intuitively and accurately understand the nature of the findings of the exam. In other words, this would have the additional benefit to help a second clinician, that would read this report, to understand faster and more accurately the findings of this exam;

The user will also be able to generate other graphics summarizing his findings in a more concise yet compact way.

He can resort to a 2D projection of the 3D modeled vascular structure, which has the advantage to present all information over one unique diagram, or He can resort to an annotated 3D tree that he rotate in a digital report.

In an example, the 3D modeled vascular structure in a digital report automatically rotates to the angulation of an angiogram that is referenced alongside the model, changing as different angiograms are viewed in the digital report along with the 3D model. In this manner, a clinician who consults the report can rotate it freely, helping him understanding the 3D geometry of these arteries, for instance in case of a follow-up examination.

Globally, the invention makes the diagram filling more transparent and less tedious, and allows for a smoother information transmission to other clinicians who would read the report afterwards.

Figure 7:
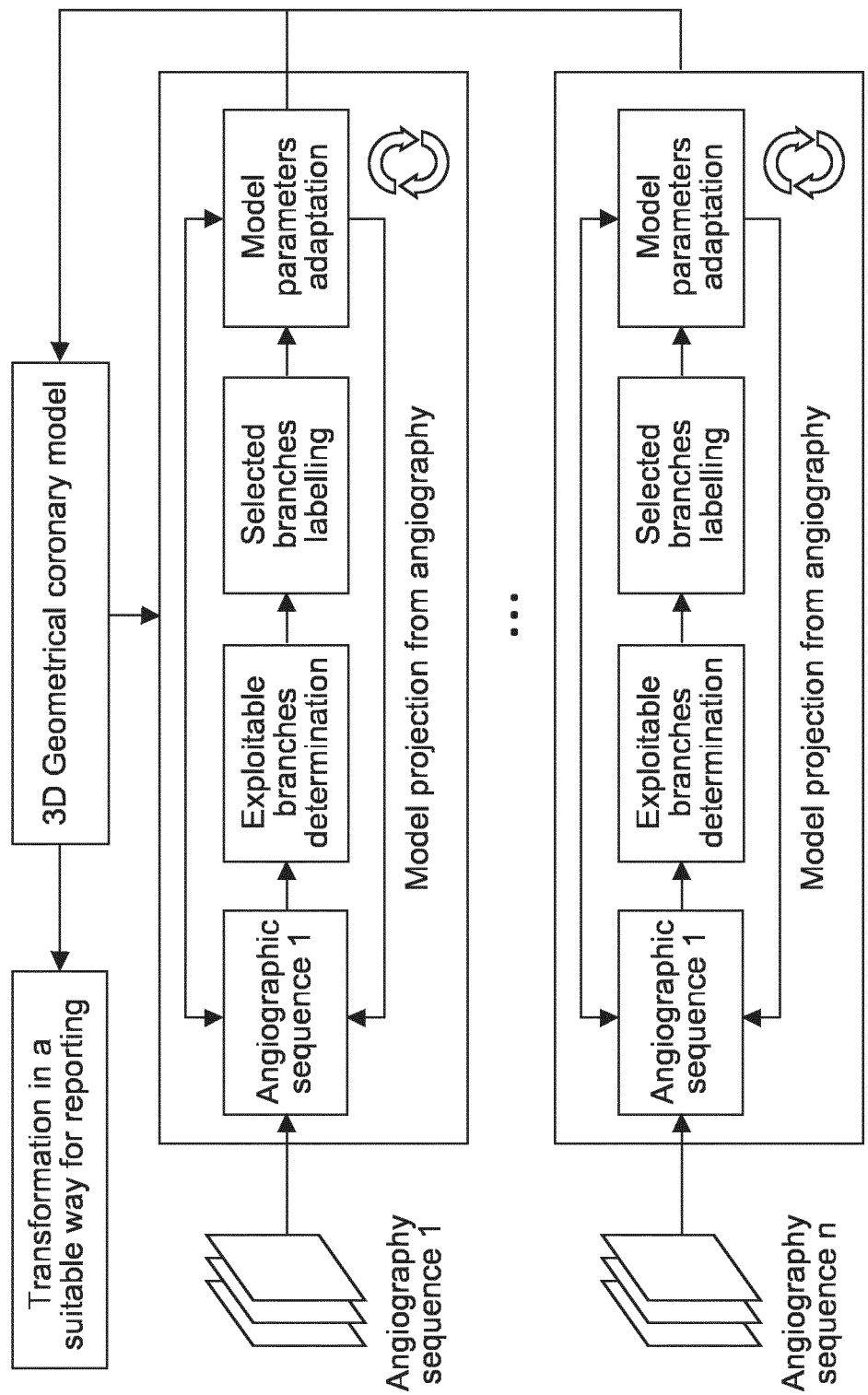
FIG. 7 shows an illustration of an example of a workflow of a method for FIG. 8 shows an illustration of an example of a workflow of a method for providing a synthetic representation of a vascular structure.

FIG. 7 shows a detailed workflow for providing a patient specific 3D model of a body part, and utilization of that 3D model for the use in a medical report. The process comprises four main steps, A-D:

Angiography Segmentation.

In a first step, the 2D coronary tree needs to be segmented. Different image processing methods can be used, for example that based on an extension of ridge filters as described in the above referenced paper on this subject. The 3D coronary model could already be exploited at that point. Even if it is not well adapted to the patient yet, it can already convey information on the expected position of vessels (and "impossible" positions of vessels). This is an iterative process, and as such some errors are acceptable at this point within a particular iteration step.

Exploitable Branches Determination

It may be that not every branch of the coronary tree is well visible on the considered angiography. First, some branches may be badly injected, or not injected at all. Second, it often happens that some branches superimpose. As a consequence, their projection on the angiography is ambiguous, and it would be dangerous to determine their geometrical parameters from that angiography. Therefore, the well-defined branches are identified, and others that are not well-defined are removed from the analysis performed from this one angiography. Since the clinician examines every branch in the course of the exam, successively choosing angulations that allows each of them to be clearly observed the branches that were ignored when studying the current angiography will later be processed (and their geometrical parameters estimated).

Angiography Branches Determination and Labelling

To match the coronary model and the segmented coronary tree (binary mask), the segmented branches are labeled. That is to say, the coronary tree is subsegmented into different branches, and the segments named. This can be achieved by first projecting the model into the angulation of acquisition, and then aligning the binary segmentation with the (imperfect) model. This equates to approach 1, as discussed under the heading "Updating the model by comparison with one angiographic image".

Alternatively, some machine learning may be exploited to classify positions along the vessels centerline. This equates to approach 2, as discussed under the heading "Updating the model by comparison with one angiographic image". Again, some errors are acceptable at this point during the first iterations of the process.

Model Parameter Adaptation

In the case of the explicit projection and warping of the 3D model (approach 1), the estimated motion parameters will directly translate into adapted 3D geometrical parameters.

In the case of approach 2, some measurements are performed on the labelled segments to better define the geometrical model. It can then be determined how the segments are branched together, and where the bifurcations are located on the main arteries. Their length can be estimated, as well as their width and tortuosity parameters.

Now that the model has been adapted, reiteration enables steps A-C to be solved with a higher accuracy. Therefore, the process can be reiterated a number of times, before moving on to the next angiographic sequence. Iteration is however not essential.

The steps A-D were described separated for the sake of clarity. They actually can be more closely linked, and possibly even merged, for highest efficiency. For instance, the alignment between projected model and segmented angiography (C) could also include the model parameter adaptation (D), as it would enrich the space of relevant transformations the model could undergo to align with the segmented tree.

Reiteration of the global scheme can be undertaken, looping on the angiography sequences. It can be for instance that the model adaptation performed based on the first angiography was imperfect, since it was initialized from a crude mean model. Errors can however be accounted for, or corrected, by exploiting the much better (more patient specific) model available after n (typically 10) angiography sequences have been processed.

Result Presentation

There are then a number of different ways of utilizing the 3D model in providing information to go into a medical report:

A 2D schematic model, similar to that shown in FIG. 4, can be generated, where vascular structure is shown schematically with no overlaps. However, the patient specific 3D model would be used to ensure that the schematic diagram had the correct branching (PDA accurately attached, ramus and conus correctly positioned) coherent with that of the patient;

A series of 2D projection of the 3D model can be generated, paired with the associated angiogram acquired at the same angulation. The synthetic angiogram would then have the correct branching system, correct branches length and bifurcation positions along said branches. There may be overlaps of the vascular structure, or different branches could be presented over separated diagrams, however the branch structure itself within the synthetic angiogram would be known and could be appropriately annotated;

The patient specific 3D model could be presented in 3D directly (see FIG. 8). The user would be able to rotate it, edit it, and reproject it from any perspective he likes.

In another exemplary embodiment, a computer program or computer program element is provided that is characterized by being configured to execute the method steps of the method according to one of the preceding embodiments, an appropriate system.

The computer program element might therefore be stored on a computer unit, which might also be part of an embodiment. This computing unit may be configured to perform or induce performing of the steps of the method described above. Moreover, it may be configured to operate the components of the above described apparatus. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An apparatus for providing a synthetic representation of a vascular structure, the apparatus comprising:
   an image data input configured to:
      provide at least one 2D X-ray image comprising 2D X-ray image data of a vascular structure of a patient's body part, and
      provide a 3D model of the body part, the 3D model comprising a 3D modelled vascular structure, and wherein the 3D model is a generic model of the body part; and
   a processor configured to:
   determine a 2D projection of the 3D model of the body part, the 2D projection of the 3D model of the body part comprising a 2D projection of the 3D modelled vascular structure,
   transform the 3D model of the body part based on the 2D X-ray image data, including aligning at least one part of the vascular structure in the 2D X-ray image data with a corresponding at least one part of the vascular structure in the 2D projection of the 3D model,
   wherein the aligning comprises progressively affining 3D position of the 3D model so that the 2D projection of the 3D modelled vascular structure matches the vascular structure in the 2D X-ray image data, and
   generate a medical report including the 2D projection of the transformed 3D modelled vascular structure.

2. The apparatus according to claim 1, wherein the processor is configured to indicate a segment of the vascular structure to be measured, perform a measurement on the segment in the 2D X-ray image and adapt a corresponding segment in the 3D modelled vascular structure based on the measurement.

3. The apparatus according to claim 1, wherein the processor is configured to enable a user to select a reporting format and views of the vascular structure and to fill in findings in the medical report.

4. The apparatus according to claim 1, wherein the at least one 2D X-ray image comprises a plurality of images and the processor is configured to:
   select a viable and distinct 2D X-ray image from the plurality of images.

5. The apparatus according to claim 1 wherein the generic model of the body part includes names of at least some of component parts of the vascular structure, which names also appear in the 2D projection included in the medical report.

6. The apparatus according to claim 1, wherein the aligning includes: (i) identifying specific points in the vascular structure represented by the 2D X-ray image data and (ii) setting parameters of the 3D model so that points in the 2D projection of the 3D modelled vascular structure match the specific points in the 2D X-ray image data.

7. A medical system for providing a synthetic representation of a vascular structure, the system comprising:
   the apparatus for providing the synthetic representation of the vascular structure according to claim 1;
   an X-ray imager configured to provide the at least one 2D X-ray image; and
   a model data output configured to output data representative of the model of the body part.

8. A method for providing a representation of a vascular structure, the method comprising:
   providing at least one 2D X-ray image comprising 2D X-ray image data of a vascular structure of a patient's body part;
   providing a 3D model of the body part, the 3D model comprising a 3D modelled vascular structure, wherein the 3D model is a generic model of the body part;
   determining a 2D projection of the 3D model of the body part, the 2D projection of the 3D model of the body part comprising a 2D projection of the 3D modelled vascular structure with the 2D X-ray image data of the vascular structure;
   transforming the 3D model of the body part including aligning at least one part of the vascular structure in the 2D X-ray image data with a corresponding at least one part of the vascular structure in the 2D projection of the 3D model;
   wherein the aligning comprises progressively affining 3D position of the 3D model so that the 2D projection of the 3D modelled vascular structure matches the vascular structure in the 2D X-ray image data; and
   generating a medical report based on information determined from the transformed 3D model.

9. A non-transitory computer readable medium storing a computer program for controlling a processor to carry out the method of claim 8.

10. The method according to claim 8, wherein vessels in the generic 3D modelled vascular structure are labeled with anatomical names and further comprising:
    projecting the 3D modelled vascular structure of the updated 3D model to generate a 2D projection image corresponding to the at least one 2D X-ray image; and
    identifying vessels in the at least one 2D X-ray image by matching with corresponding vessels in the 2D projection image.

11. The method according to claim 8 further comprising:
    projecting the 3D modelled vascular structure of the updated 3D model to generate a 2D projection image corresponding to the at least one 2D X-ray image; and
    entering findings regarding the at least one 2D X-ray image on the 2D projection image and incorporating the 2D projection image in the medical report.

12. An apparatus for providing a synthetic representation of a vascular structure, the apparatus comprising:
    an image data input configured to receive at least one 2D X-ray image of a vascular structure of a patient's body part and an annotated 3D diagram of the vascular structure with at least some components of the vascular structure named;
    a processor configured to:
    determine a 2D projection of the annotated 3D diagram of the vascular structure;
    transform the annotated 3D diagram of the vascular structure for conformity with the 2D X-ray image, including aligning at least one part of the vascular structure in the 2D X-ray image with a corresponding at least one part of the vascular structure in the 2D projection of the annotated 3D diagram, wherein the aligning comprises progressively affining 3D position of the 3D annotated diagram so that the 2D projection of the vascular structure in the 3D annotated diagram matches the vascular structure in the 2D X-ray image data; and generate a medical report including the 2D projection of the transformed annotated 3D diagram of the vascular structure.

13. The apparatus according to claim 12, wherein the image data input is further configured to:

receive information relating to a geometrical configuration of an X-ray acquisition unit that was used to acquire the at least one 2D X-ray image, and wherein the transform of the annotated 3D diagram of the vascular structure comprises utilization of the information relating to the geometrical configuration of the X-ray acquisition unit.

14. The apparatus according to claim 12, wherein transforming the annotated 3D diagram of the vascular structure includes applying a scaling factor.

15. The apparatus according to claim 14, wherein the transforming the annotated 3D diagram of the vascular structure includes applying an affine transform.

16. The apparatus according to claim 12, wherein transforming the annotated 3D diagram of the vascular structure includes translating the annotated 3D diagram of the vascular structure.

17. The apparatus according to claim 12, wherein the processor is further configured to:

enable a user to fill in findings concerning the 2D X-ray image in conjunction with the 2D projection of the annotated 3D diagram of the vascular structure in the medical report.

18. The apparatus according to claim 12, wherein the at least one 2D X-ray image comprises a plurality of images, wherein the processor is further configured to select a visible and distinct 2D X-ray image from the plurality of images.

* * * * *